US012471087B2

(12) United States Patent
Xu et al.

(10) Patent No.: US 12,471,087 B2
(45) Date of Patent: Nov. 11, 2025

(54) METHOD, APPARATUS, AND SYSTEM FOR SENDING SIDELINK CHANNEL STATE INFORMATION REPORT

(71) Applicant: Huawei Technologies Co., Ltd., Shenzhen (CN)

(72) Inventors: Haibo Xu, Beijing (CN); Jun Wang, Shanghai (CN); Dongdong Wei, Shanghai (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 685 days.

(21) Appl. No.: 17/755,428

(22) PCT Filed: Nov. 6, 2020

(86) PCT No.: PCT/CN2020/127297
§ 371 (c)(1),
(2) Date: Apr. 28, 2022

(87) PCT Pub. No.: WO2021/089020
PCT Pub. Date: May 14, 2021

(65) Prior Publication Data
US 2022/0369346 A1 Nov. 17, 2022

(30) Foreign Application Priority Data
Nov. 8, 2019 (CN) .......................... 201911090524.3

(51) Int. Cl.
*H04W 72/20* (2023.01)
*H04W 72/543* (2023.01)
*H04W 92/18* (2009.01)

(52) U.S. Cl.
CPC ......... *H04W 72/20* (2023.01); *H04W 72/543* (2023.01); *H04W 92/18* (2013.01)

(58) Field of Classification Search
CPC ... H04W 72/20; H04W 72/543; H04W 92/18; H04W 4/40; H04W 24/10; H04W 72/23;
(Continued)

(56) References Cited

U.S. PATENT DOCUMENTS

2019/0053251 A1   2/2019  Loehr et al.
2020/0236694 A1*  7/2020  Wu ........................ H04W 72/23
2021/0105055 A1*  4/2021  Chae .................... H04L 5/0091

FOREIGN PATENT DOCUMENTS

CN   109565395 A   4/2019
CN   110140408 A   8/2019
(Continued)

OTHER PUBLICATIONS

Samsung, "On Physical Layer Procedures for NR V2X", 3GPP TSG RAN WG1 #98, R1-1908481, Prague, CZ, Aug. 26-30, 2019, 20 pages.
(Continued)

Primary Examiner — Marisol Figueroa
(74) Attorney, Agent, or Firm — Slater Matsil, LLP

(57) ABSTRACT

When a first sidelink channel state information CSI report is triggered, a first terminal obtains a first sidelink resource configured by a base station for the first terminal, where the first sidelink resource can be used to transmit the sidelink CSI report. The first terminal sends the first sidelink CSI report to a second terminal on the first sidelink resource, where the first sidelink CSI report is used to feed back CSI of a sidelink between the first terminal and the second terminal.

22 Claims, 12 Drawing Sheets

(58) Field of Classification Search
CPC .... H04W 76/14; H04W 72/25; H04B 7/0626; H04L 1/1858
See application file for complete search history.

(56) References Cited

FOREIGN PATENT DOCUMENTS

| JP | 2020528694 A | | 9/2020 | |
|---|---|---|---|---|
| WO | WO-2018072844 A1 | * | 4/2018 | .......... H04W 74/004 |
| WO | 2018174257 A1 | | 9/2018 | |
| WO | WO-2018232307 A1 | * | 12/2018 | ........... H04L 5/0082 |
| WO | 2019124067 A1 | | 6/2019 | |
| WO | 2019144270 A1 | | 8/2019 | |
| WO | WO-2021030565 A1 | * | 2/2021 | ........... H04L 1/0026 |
| WO | 2021091302 A1 | | 5/2021 | |
| WO | WO-2021091339 A1 | * | 5/2021 | ........... H04B 7/0626 |

OTHER PUBLICATIONS

NTT DOCOMO Inc. et al., "NR Sidelink Resource Allocation Mechanism Mode 1", 3GPP TSG RAN WG1 #96bis, R1-1905422, Xi'an, China, Apr. 8-12, 2019, 5 pages.

Huawei et al., "Further discussion on the Sidelink CSI reporting related issues", 3GPP TSG-RAN WG2 Meeting #109 electronic, R2-2000711, Feb. 24-Mar. 6, 2020, 5 pages.

Huawei et al., "Discussion on remaining MAC open issues for 5G V2X with NR SL", 3GPP TSG-RAN WG2 Meeting# 109-bis electronic R2-2003555, Apr. 10, 2020, total 28 pages.

3GPP TSG RAN WG1 Meeting #98 R1-1909438, Sidelink CSI, Huawei, HiSilicon, Aug. 17, 2019, total 9 pages.

TCL Communication, "Physical Layer Procedures for Sidelink", 3GPP TSG RAN WG1 Meeting #98B, R1-1910413, Chongqing, China, Oct. 14-20, 2019, 15 pages.

3GPP TS 38.214 V15.7.0 (Sep. 2019), 3rd Generation Partnership Project; Technical Specification Group Radio Access Network; NR; Physical layer procedures for data (Release 15), 51 pages.

Spreadtrum Communications, "Discussion on physical layer procedures for sidelink", 3GPP TSG RAN WG1 #98bis, R1-1910009, Chongqing, China, Oct. 14-20, 2019, 6 pages.

3GPP TS 38.323 V15.6.0 (Jun. 2019), 3rd Generation Partnership Project; Technical Specification Group Radio Access Network; NR; Packet Data Convergence Protocol (PDCP) specification (Release 15), 26 pages.

3GPP TS 23.287 V16.0.0 (Sep. 2019) 3rd Generation Partnership Project; Technical Specification Group Services and System Aspects; Architecture enhancements for 5G System (5GS) tosupportVehicle-to-Everything (V2X) services (Release 16), 49 pages.

3GPP TS 38.213 V15.7.0 (Sep. 2019), 3rd Generation Partnership Project; Technical Specification Group Radio Access Network; NR; Physical layer procedures for control(Release 15), 108 pages.

3GPP TS 38.321 V15.7.0 (Sep. 2019, 3rd Generation Partnership Project; Technical Specification Group Radio Access Network; NR; Medium Access Control (MAC) protocol specification (Release 15), 78 pages.

3GPP TS 38.331 V15.7.0 (Sep. 2019), 3rd Generation Partnership Project; Technical Specification Group Radio Access Network; NR; Radio Resource Control (RRC) protocol specification (Release 15), 527 pages.

* cited by examiner

METHOD, APPARATUS, AND SYSTEM FOR SENDING SIDELINK CHANNEL STATE INFORMATION REPORT

CROSS-REFERENCE TO RELATED APPLICATIONS

This application is a national stage of International Application No. PCT/CN2020/127297, filed on Nov. 6, 2020, which claims priority to Chinese Patent Application No. 201911090524.3, filed on Nov. 8, 2019. Both of the aforementioned applications are hereby incorporated by reference in their entireties.

TECHNICAL FIELD

Embodiments of this application relate to the field of communications technologies, and in particular, to a method, an apparatus, and a system for sending a sidelink channel state information report.

BACKGROUND

In new radio (new radio, NR) V2X, for unicast communication, a sidelink CSI feedback mechanism is introduced, so that a terminal 1 can set, based on channel state information (channel state information, CSI) of a sidelink (sidelink), a modulation and coding scheme used for data transmission. A feedback mechanism thereof is shown in FIG. 1. A terminal 2 sends a CSI trigger indication to a terminal 1, and the terminal 1 feeds back CSI to the terminal 2 after receiving the trigger indication.

To transmit information including the CSI that is to be fed back to the terminal 2, the terminal 1 first needs to obtain a sidelink resource. However, when the terminal 1 is in a radio resource control (radio resource control, RRC) connected mode, and a base station configures the terminal 1 to perform sidelink communication by using a resource allocation manner that is based on scheduling by the base station, currently there is no prior-art method for obtaining a sidelink resource for CSI transmission.

Currently, in the prior art, the terminal 1 may send the CSI by using a sidelink resource 1 used for sending sidelink data to the terminal 2. The terminal 1 may request the sidelink resource 1 in the following manner:

When the terminal 1 needs to send sidelink data to the terminal 2, the terminal 1 may request the sidelink resource 1 from the base station by triggering a sidelink buffer status report (Buffer Status Report, BSR) and a scheduling request (Scheduling Request, SR). In this case, there may be the following problems:

If the terminal 1 has no sidelink data that needs to be sent to the terminal 2, the terminal 1 cannot obtain the sidelink resource 1 for CSI transmission. Alternatively, if the terminal 1 has the sidelink resource 1, but the sidelink resource 1 cannot meet a requirement of a maximum allowed transmission delay of the CSI, the CSI sent by the terminal 1 to the terminal 2 on the sidelink resource 1 is of no value for reference.

Based on this, how the terminal 1 obtains a sidelink resource for CSI transmission is a technical problem that needs to be resolved urgently.

SUMMARY

Embodiments of this application provide a method, an apparatus, and a system for sending a sidelink channel state information report, to avoid a case in which a terminal has no available sidelink resource used for CSI feedback.

To achieve the foregoing objective, the following technical solutions are used in this application.

According to a first aspect, a method for sending a sidelink channel state information CSI report is provided, including: When a first sidelink channel state information CSI report is triggered, a first terminal obtains a first sidelink resource that is configured by a base station for the first terminal and that can be used to transmit the sidelink CSI report. The first terminal sends the first sidelink CSI report to a second terminal on the first sidelink resource. The first sidelink CSI report is used by the first terminal to feed back, to the second terminal, CSI of a sidelink between the first terminal and the second terminal.

This embodiment of this application provides the method for sending a sidelink channel state information CSI report. In the method, when the first sidelink channel state information CSI report is triggered, the first terminal obtains the first sidelink resource that is configured by the base station for the first terminal and that is used to transmit the sidelink CSI report. In this way, the first terminal can send the first sidelink CSI report to the second terminal on the first sidelink resource in a timely manner, so that the second terminal sets a modulation and coding scheme of sidelink data in a timely manner based on the CSI of the sidelink between the first terminal and the second terminal. The method can avoid a prior-art case in which there is no available sidelink resource used for CSI feedback.

In a possible design, when the first sidelink channel state information CSI report is triggered, the method provided in this embodiment of this application further includes: The first terminal triggers a first scheduling request SR if a preset condition is met. The first terminal sends the first SR to the base station on a first SR resource based on a first SR configuration. The first SR configuration and the first SR resource correspond to an SR used to request a sidelink resource for transmitting the sidelink CSI report. When the first terminal needs to feed back the CSI, but the first terminal has no available sidelink resource, the first terminal can obtain, in a timely manner by sending the first SR, the sidelink resource for sending the first sidelink CSI report.

In a possible design, the first SR configuration and the first SR resource may be predefined in a protocol.

In a possible design, the preset condition includes one or more of the following: The first terminal has no sidelink resource for transmitting the first sidelink CSI report; or the first terminal triggers a sidelink buffer status report BSR, but has no uplink resource for transmitting the sidelink BSR; or if the first terminal has no sidelink resource for transmitting the first sidelink CSI report, the first terminal triggers a sidelink buffer status report BSR, but has no uplink resource for transmitting the sidelink BSR. In this way, a condition for triggering the first SR by the first terminal is more flexible.

In a possible design, before the first terminal sends the first SR to the base station on the first SR resource based on the first SR configuration, the method provided in this embodiment of this application further includes: The first terminal receives a second message from the base station. The second message includes a first SR configuration identifier. The first SR configuration identifier is associated with the first SR configuration and the first SR resource. In this way, the base station can dynamically configure the first SR configuration and the first SR resource for the first terminal.

In a possible design, the second message may further include the first SR configuration and information about the first SR resource. The information about the first SR resource is used to determine a location of the first SR resource.

In a possible design, the method provided in this embodiment of this application further includes: The first terminal starts a first timer when the first sidelink CSI report is triggered. The first terminal cancels the first sidelink CSI report if a first condition is met when the first timer times out.

The first condition includes one or more of the following: The first terminal does not receive the first sidelink resource; or the first terminal does not generate a media access control protocol data unit MAC PDU that includes the first sidelink CSI report; or the first terminal does not send a MAC PDU that includes the first sidelink CSI report. When the timer times out, it indicates that a maximum allowed delay for sending the first sidelink CSI report is already reached, and if the first sidelink CSI report continues to be sent to the second terminal, the first sidelink CSI report may be of no value for reference for the second terminal. Therefore, a waste of signaling can be avoided by canceling the first sidelink CSI report by the first terminal.

In a possible design, the method provided in this embodiment of this application further includes: The first terminal stops the first timer if a second condition is met during running of the first timer. The second condition includes one or more of the following: The first terminal receives the first sidelink resource; or the first terminal generates a MAC PDU that includes the first sidelink CSI report; or the first terminal already sends a MAC PDU that includes the first sidelink CSI report. "During running of the first timer" means that the first timer is in a started state within configured duration.

In a possible design, when the first sidelink channel state information CSI report is triggered, the method provided in this embodiment of this application further includes: The first terminal receives a configuration grant from the base station. The configuration grant is used by the first terminal to determine a sidelink resource that is configured by the base station for the first terminal and that can be used to transmit the sidelink CSI report. The configuration grant is sent to the first terminal. In this way, when the first terminal determines that there is a possibility of CSI feedback, the first terminal can obtain, in advance, the sidelink resource used to transmit the sidelink CSI report. When the first terminal is triggered to feed back the CSI, the first terminal may send the first sidelink CSI report by using the obtained sidelink resource. Moreover, a case in which the first terminal has no available sidelink resource for CSI feedback can also be avoided.

In a possible design, the configuration grant is used to indicate information about one or more sidelink resources configured for the first terminal. The one or more sidelink resources can be used to transmit the sidelink CSI report. The first sidelink resource is a sidelink resource in the one or more sidelink resources. In this manner, when the first terminal triggers the first sidelink CSI report, the first terminal can obtain, in advance by using the configuration grant, the sidelink resource used to transmit the sidelink CSI report.

In a possible design, the configuration grant is used to indicate a period of a second sidelink resource configured for the first terminal. When the first sidelink channel state information CSI report is triggered, the method provided in this embodiment of this application further includes: The first terminal triggers a second scheduling request SR if the configuration grant is not activated. The first terminal sends the second SR to the base station on a second SR resource based on a second SR configuration. The second SR configuration and the second SR resource correspond to an SR used to request to activate the configuration grant. According to the method, when determining that a sidelink CSI report needs to be sent, the first terminal obtains, by activating the configuration grant, a sidelink resource for sending the sidelink CSI report.

In a possible design, the second SR configuration and the second SR resource may be predefined in a protocol.

In a possible design, before the first terminal sends the second SR to the base station on the second SR resource based on the second SR configuration, the method provided in this embodiment of this application further includes: The first terminal receives a second SR configuration identifier from the base station. The second SR configuration identifier is associated with the second SR configuration and the second SR resource.

In a possible design, the method provided in this embodiment of this application further includes: The first terminal receives the second SR configuration and information about the second SR resource from the base station.

In a possible design, before the first sidelink channel state information CSI report is triggered, the method provided in this embodiment of this application further includes: The first terminal sends, to the base station, a first message that includes first indication information. The first indication information is used to indicate that the first terminal needs to transmit the sidelink CSI report. This helps the base station to determine that the first terminal needs to transmit the sidelink CSI report, so as to configure, for the first terminal, information used to obtain the first sidelink resource. For example, the information used to obtain the first sidelink resource may be information about the first sidelink resource, or the information used to obtain the first sidelink resource may be the configuration grant.

In a possible design, the first message further includes an assistance information set. The assistance information set includes at least one of the following information: the maximum allowed delay of the first sidelink CSI report, HARQ feedback configuration information of the first sidelink CSI report, a maximum quantity of retransmissions of the first sidelink CSI report, a length of first signaling for transmitting the first sidelink CSI report, and a period and a time offset value of the first sidelink CSI report. This can assist the base station in configuring the first sidelink resource for the first terminal.

In a possible design, the method provided in this embodiment of this application further includes: In a process of sidelink logical channel priority processing, the first terminal determines that a priority of the first signaling that carries the first sidelink CSI report is a highest priority, or that a priority of the first signaling is a first priority.

In a possible design, the method provided in this embodiment of this application further includes: When a moment at which the first terminal sends the MAC PDU that includes the first signaling conflicts with a moment at which the first terminal performs communication on a first-standard sidelink, the first terminal sends the MAC PDU that includes the first signaling. Alternatively, the first terminal determines, based on a second priority of the first signaling, whether to send the MAC PDU that includes the first signaling. The first signaling includes the first sidelink CSI report.

In a possible design, the method provided in this embodiment of this application further includes: The first terminal sends second indication information to the second terminal. The second indication information is used to indicate the second terminal not to send HARQ information, or the second indication information indicates the second terminal to send HARQ information. The HARQ information is for the MAC PDU that includes the first sidelink CSI report.

In a possible design, when the following third condition is met, the second indication information indicates the second terminal not to send the HARQ information. The third condition includes one or more of the following: The MAC PDU that includes the first sidelink CSI report is configured not to support HARQ information feedback; or the first sidelink CSI report does not support HARQ information feedback; or the base station configures that the MAC PDU that includes the first sidelink CSI report does not support HARQ information feedback.

In a possible design, when the following fourth condition is met, the second indication information indicates the second terminal to send the HARQ information. The fourth condition includes one or more of the following: The MAC PDU that includes the first sidelink CSI report is configured to support HARQ information feedback; or the first sidelink CSI report supports HARQ information feedback; or the base station configures that the MAC PDU that includes the first sidelink CSI report supports HARQ information feedback.

In a possible design, the MAC PDU that includes the first sidelink CSI report further includes sidelink data carried on a first sidelink logical channel. The third condition further includes: Of the first sidelink logical channel and the first signaling included in the MAC PDU that includes the first sidelink CSI report, the one whose priority is higher does not support HARQ information feedback. The fourth condition further includes: Of the first sidelink logical channel and the first signaling, the one whose priority is higher supports HARQ information feedback.

According to a second aspect, an embodiment of this application provides a method for sending a sidelink channel state information report, including: A base station sends, to a first terminal, a first sidelink resource configured for the first terminal. The first sidelink resource can be used to transmit the sidelink CSI report.

In a possible design, before the base station sends, to the first terminal, the first sidelink resource configured for the first terminal, the method provided in this embodiment of this application further includes: The base station receives a first SR sent from the first terminal on a first scheduling request SR resource. The first SR corresponds to a first SR configuration. The first SR configuration and the first SR resource correspond to an SR used to request a sidelink resource for transmit the sidelink CSI report.

In a possible design, before the base station receives the first SR sent from the first terminal on the first scheduling request SR resource, the method provided in this embodiment of this application further includes: The base station sends, to the first terminal, a second message that includes a first SR configuration identifier. The first SR configuration identifier is associated with the first SR configuration and the first SR resource.

In a possible design, the sending, by a base station to a first terminal, a first sidelink resource configured for the first terminal includes: The base station sends information about the first sidelink resource to the first terminal based on the first SR. The information about the first sidelink resource is used to determine a time domain resource location and frequency domain resource location of the first sidelink resource.

In a possible design, before the base station sends, to the first terminal, the first sidelink resource configured for the first terminal, the method provided in this embodiment of this application further includes: The base station sends a configuration grant to the first terminal. The configuration grant is used by the first terminal to determine a sidelink resource that is configured by the base station for the first terminal and that can be used to transmit the sidelink CSI report.

In a possible design, the configuration grant is used to indicate information about one or more sidelink resources configured for the first terminal. The one or more sidelink resources can be used to transmit the sidelink CSI report. The first sidelink resource is a sidelink resource in the one or more sidelink resources.

In a possible design, the configuration grant is used to indicate a period of a second sidelink resource configured for the first terminal. The method provided in this embodiment of this application further includes: The base station receives a second SR sent from the first terminal on a second SR resource. The second SR corresponds to a second SR configuration. The second SR configuration and the second SR resource correspond to an SR used to request to activate the configuration grant.

In a possible design, before the base station receives the second SR sent from the first terminal on the second SR resource, the method provided in this embodiment of this application further includes: The base station sends a second SR configuration identifier to the first terminal. The second SR configuration identifier is associated with the second SR configuration and the second SR resource.

In a possible design, before the base station sends, to the first terminal, the first sidelink resource configured for the first terminal, the method provided in this embodiment of this application further includes: The base station receives a first message that is from the first terminal and that includes first indication information. The first indication information is used to indicate that the first terminal needs to transmit a sidelink CSI report.

In a possible design, the first message further includes an assistance information set. The assistance information set includes at least one of the following information: a maximum allowed delay of a first sidelink CSI report, HARQ feedback configuration information of the first sidelink CSI report, a maximum quantity of retransmissions of the first sidelink CSI report, a length of first signaling for transmitting the first sidelink CSI report, and a period and a time offset value of the first sidelink CSI report. In this way, the base station can configure the first sidelink resource for the first terminal based on a parameter in the assistance information set.

According to a third aspect, this application provides a communications apparatus. The communications apparatus can implement the method according to any one of the first aspect or the possible implementations of the first aspect, and therefore can also implement beneficial effects in any one of the first aspect or the possible implementations of the first aspect. The communications apparatus may be a first terminal, or may be an apparatus that can support a first terminal in implementing the method according to any one of the first aspect or the possible implementations of the first aspect, for example, a chip applied to the first terminal. The apparatus may implement the foregoing method by using software or hardware, or by executing corresponding software by hardware.

For example, the communications apparatus includes a processing unit and a communications unit. The communications unit is configured to receive and send information.

The processing unit is configured to process an action other than information receiving and sending.

Specifically, when a first sidelink channel state information CSI report is triggered, the processing unit is configured to obtain a first sidelink resource that is configured by a base station for the apparatus and that can be used to transmit the sidelink CSI report. The communications unit sends the first sidelink CSI report to a second terminal on the first sidelink resource. The first sidelink CSI report is used by the communications unit to feed back, to the second terminal, CSI of a sidelink between the apparatus and the second terminal.

In a possible design, when the first sidelink channel state information CSI report is triggered, the processing unit is further configured to trigger a first scheduling request SR if a preset condition is met. The communications unit is configured to send the first SR to the base station on a first SR resource based on a first SR configuration. The first SR configuration and the first SR resource correspond to an SR used to request a sidelink resource for transmitting the sidelink CSI report.

In a possible design, the first SR configuration and the first SR resource may be predefined in a protocol.

In a possible design, the preset condition includes one or more of the following: The apparatus has no sidelink resource for transmitting the first sidelink CSI report; or the processing unit triggers a sidelink buffer status report BSR, but has no uplink resource for transmitting the sidelink BSR; or if the apparatus has no sidelink resource for transmitting the first sidelink CSI report, the processing unit triggers a sidelink buffer status report BSR, but has no uplink resource for transmitting the sidelink BSR.

In a possible design, before sending the first SR to the base station on the first SR resource based on the first SR configuration, the communications unit is further configured to receive a second message from the base station. The second message includes a first SR configuration identifier. The first SR configuration identifier is associated with the first SR configuration and the first SR resource.

In a possible design, the second message may further include the first SR configuration and information about the first SR resource. The information about the first SR resource is used to determine a location of the first SR resource.

In a possible design, the processing unit is further configured to start a first timer when the first sidelink CSI report is triggered. The processing unit is further configured to cancel the first sidelink CSI report if a first condition is met when the first timer times out.

The first condition includes one or more of the following: The processing unit does not receive the first sidelink resource; or the processing unit does not generate a media access control protocol data unit MAC PDU that includes the first sidelink CSI report; or the communications unit does not send a MAC PDU that includes the first sidelink CSI report. When the timer times out, it indicates that a maximum allowed delay for sending the first sidelink CSI report is already reached, and if the first sidelink CSI report continues to be sent to the second terminal, the first sidelink CSI report may be of no value for reference for the second terminal. Therefore, a waste of signaling can be avoided by canceling the first sidelink CSI report by the first terminal.

In a possible design, the processing unit is further configured to stop the first timer if a second condition is met during running of the first timer. The second condition includes one or more of the following: The communications unit receives the first sidelink resource; or the processing unit generates a MAC PDU that includes the first sidelink CSI report; or the processing unit already sends a MAC PDU that includes the first sidelink CSI report. "During running of the first timer" means that the first timer is in a started state within configured duration.

In a possible design, the communications unit is further configured to receive a configuration grant from the base station when the first sidelink channel state information CSI report is triggered. The configuration grant is used by the apparatus to determine a sidelink resource that is configured by the base station for the apparatus and that can be used to transmit the sidelink CSI report.

In a possible design, the configuration grant is used to indicate information about one or more sidelink resources configured for the apparatus. The one or more sidelink resources can be used to transmit the sidelink CSI report. The first sidelink resource is a sidelink resource in the one or more sidelink resources.

In a possible design, the configuration grant is used to indicate a period of a second sidelink resource configured for the apparatus. If the configuration grant is not activated, the processing unit is further configured to trigger a second scheduling request SR when the first sidelink channel state information CSI report is triggered. The communications unit is configured to send the second SR to the base station on a second SR resource based on a second SR configuration. The second SR configuration and the second SR resource correspond to an SR used to request to activate the configuration grant.

In a possible design, the second SR configuration and the second SR resource may be predefined in a protocol.

In a possible design, before sending the second SR to the base station on the second SR resource based on the second SR configuration, the communications unit is further configured to receive a second SR configuration identifier from the base station. The second SR configuration identifier is associated with the second SR configuration and the second SR resource.

In a possible design, the communications unit is further configured to receive the second SR configuration and information about the second SR resource from the base station.

In a possible design, when the first sidelink channel state information CSI report is triggered, the communications unit is further configured to send, to the base station, a first message that includes first indication information. The first indication information is used to indicate that the apparatus needs to transmit the sidelink CSI report.

In a possible design, the first message further includes an assistance information set. The assistance information set includes at least one of the following information: a maximum allowed delay of the first sidelink CSI report, HARQ feedback configuration information of the first sidelink CSI report, a maximum quantity of retransmissions of the first sidelink CSI report, a length of first signaling for transmitting the first sidelink CSI report, and a period and a time offset value of the first sidelink CSI report.

In a possible design, in a process of sidelink logical channel priority processing, the processing unit is further configured to determine that a priority of the first signaling that carries the first sidelink CSI report is a highest priority, or that a priority of the first signaling is a first priority.

In a possible design, when a moment at which the communications unit sends the MAC PDU that includes the first signaling conflicts with a moment at which the communications apparatus performs communication on a first-standard sidelink, the communications unit is configured to send the MAC PDU that includes the first signaling. Alternatively, the processing unit is configured to determine, based on a second priority of the first signaling, whether to send the MAC PDU that includes the first signaling. The first signaling includes the first sidelink CSI report.

In a possible design, the communications unit is further configured to send second indication information to the second terminal. The second indication information is used to indicate the second terminal not to send HARQ information, or the second indication information indicates the second terminal to send HARQ information. The HARQ information is for the MAC PDU that includes the first sidelink CSI report.

In a possible design, when the following third condition is met, the second indication information indicates the second terminal not to send the HARQ information that is for the MAC PDU. The third condition includes one or more of the following: The MAC PDU that includes the first sidelink CSI report is configured not to support HARQ information feedback; or the first sidelink CSI report does not support HARQ information feedback; or the base station configures that the MAC PDU that includes the first sidelink CSI report does not support HARQ information feedback.

In a possible design, when the following fourth condition is met, the second indication information indicates the second terminal to send the HARQ information that is for the MAC PDU. The fourth condition includes one or more of the following: The MAC PDU that includes the first sidelink CSI report is configured to support HARQ information feedback; or the first sidelink CSI report supports HARQ information feedback; or the base station configures that the MAC PDU that includes the first sidelink CSI report supports HARQ information feedback.

In a possible design, the MAC PDU that includes the first sidelink CSI report further includes sidelink data carried on a first sidelink logical channel. The third condition further includes: Of the first sidelink logical channel and the first signaling, the one whose priority is higher does not support HARQ information feedback. The fourth condition further includes: Of the first sidelink logical channel and the first signaling, the one whose priority is higher supports HARQ information feedback.

For another example, an embodiment of this application provides a communications apparatus. The communications apparatus may be a first terminal, or may be a chip in a first terminal. When the communications apparatus is the first terminal, the communications unit may be a transceiver, or include one or more modules that have an information receiving and sending function; and the processing unit may be a processor, or include one or more modules that have a processing capability. The communications apparatus may further include a storage unit. The storage unit may be a memory. The storage unit is configured to store computer program code. The computer program code includes instructions. The processing unit executes the instructions stored in the storage unit, so that the first terminal implements the method for sending a sidelink channel state information report according to any one of the first aspect or the possible implementations of the first aspect. When the communications apparatus is the chip in the first terminal, the processing unit may be a processor, and the communications unit may be generally referred to as a communications interface. For example, the communications interface may be an input/output interface, a pin, or a circuit. The processing unit executes the computer program code stored in the storage unit, so that the first terminal implements the method for sending a sidelink channel state information report according to any one of the first aspect or the possible implementations of the first aspect. The storage unit may be a storage unit (for example, a register or a cache) in the chip, or may be a storage unit (for example, a read-only memory or a random access memory) that is located outside the chip and that is in the first terminal.

Optionally, the processor, the communications interface/the transceiver, and the memory are coupled to each other.

According to a fourth aspect, this application provides a communications apparatus. The communications apparatus can implement the method according to any one of the second aspect or the possible implementations of the second aspect, and therefore can also implement beneficial effects in any one of the second aspect or the possible implementations of the second aspect. The communications apparatus may be a base station, or may be an apparatus that can support a base station in implementing the method according to any one of the second aspect or the possible implementations of the second aspect, for example, a chip applied to the base station. The apparatus may implement the foregoing method by using software or hardware, or by executing corresponding software by hardware.

For example, the communications apparatus provided in this embodiment of this application includes a communications unit and a processing unit. The processing unit is configured to process an action other than information receiving and sending. The communications unit is configured to send, to a first terminal, a first sidelink resource configured for the first terminal. The first sidelink resource can be used to transmit the sidelink CSI report.

In a possible design, the communications unit is further configured to receive a first SR sent from the first terminal on a first scheduling request SR resource. The first SR corresponds to a first SR configuration. The first SR configuration and the first SR resource correspond to an SR used to request a sidelink resource for transmitting the sidelink CSI report.

In a possible design, the communications unit is further configured to send, to the first terminal, a second message that includes a first SR configuration identifier. The first SR configuration identifier is associated with the first SR configuration and the first SR resource.

In a possible design, the communications unit is further configured to send information about the first sidelink resource to the first terminal based on the first SR. The information about the first sidelink resource is used to determine a time domain resource location and frequency domain resource location of the first sidelink resource.

In a possible design, the communications unit is further configured to send a configuration grant to the first terminal. The configuration grant is used by the first terminal to determine a sidelink resource that is configured for the first terminal and that can be used to transmit the sidelink CSI report.

In a possible design, the configuration grant is used to indicate information about one or more sidelink resources configured for the first terminal. The one or more sidelink resources can be used to transmit the sidelink CSI report. The first sidelink resource is a sidelink resource in the one or more sidelink resources.

In a possible design, the configuration grant is used to indicate a period of a second sidelink resource configured for the first terminal. The communications unit is further configured to receive a second SR sent from the first terminal on a second SR resource. The second SR corresponds to a second SR configuration. The second SR configuration and the second SR resource correspond to an SR used to request to activate the configuration grant.

In a possible design, the communications unit is further configured to send a second SR configuration identifier to the first terminal. The second SR configuration identifier is associated with the second SR configuration and the second SR resource.

In a possible design, the communications unit is further configured to receive a first message that is from the first terminal and that includes first indication information. The first indication information is used to indicate that the first terminal needs to transmit a sidelink CSI report.

In a possible design, the first message further includes an assistance information set. The assistance information set includes at least one of the following information: a maximum allowed delay of a first sidelink CSI report, HARQ feedback configuration information of the first sidelink CSI report, a maximum quantity of retransmissions of the first sidelink CSI report, a length of first signaling for transmitting the first sidelink CSI report, and a period and a time offset value of the first sidelink CSI report.

For another example, an embodiment of this application provides a communications apparatus. The communications apparatus may be a base station, or may be a chip in a base station. When the communications apparatus is the base station, the communications unit may be a transceiver, or include one or more modules that have an information receiving and sending function; and the processing unit may be a processor, or include one or more modules that have a processing capability. The communications apparatus may further include a storage unit. The storage unit may be a memory. The storage unit is configured to store computer program code. The computer program code includes instructions. The processing unit executes the instructions stored in the storage unit, so that the base station implements the method for sending a sidelink channel state information report according to any one of the second aspect or the possible implementations of the second aspect. When the communications apparatus is the chip in the base station, the processing unit may be a processor, and the communications unit may be generally referred to as a communications interface. For example, the communications interface may be an input/output interface, a pin, or a circuit. The processing unit executes the computer program code stored in the storage unit, so that the base station implements the method for sending a sidelink channel state information report according to any one of the second aspect or the possible implementations of the second aspect. The storage unit may be a storage unit (for example, a register or a cache) in the chip, or may be a storage unit (for example, a read-only memory or a random access memory) that is located outside the chip and that is in the base station.

Optionally, the processor, the communications interface/the transceiver, and the memory are coupled to each other.

According to a fifth aspect, an embodiment of this application provides a computer readable storage medium. The computer readable storage medium stores a computer program or instructions. When the computer program or the instructions is/are run on a computer, the computer is enabled to perform the method for sending a sidelink channel state information report according to any one of the first aspect or the possible implementations of the first aspect.

According to a sixth aspect, an embodiment of this application provides a computer readable storage medium. The computer readable storage medium stores a computer program or instructions. When the computer program or the instructions is/are run on a computer, the computer is enabled to perform the method for sending a sidelink channel state information report according to any one of the second aspect or the possible implementations of the second aspect.

According to a seventh aspect, an embodiment of this application provides a computer program product that includes instructions. When the instructions are run on a computer, the computer is enabled to perform the method for sending a sidelink channel state information report according to any one of the first aspect or the possible implementations of the first aspect.

According to an eighth aspect, this application provides a computer program product that includes instructions. When the instructions are run on a computer, the computer is enabled to perform the method for sending a sidelink channel state information report according to any one of the second aspect or the possible implementations of the second aspect.

According to a ninth aspect, an embodiment of this application provides a communications system. The communications system includes the communications apparatus according to any one of the third aspect or the possible designs of the third aspect, and the communications apparatus according to any one of the fourth aspect or the possible designs of the fourth aspect.

Optionally, the communications system may further include a second terminal. The second terminal is configured to trigger the first terminal to feed back CSI.

According to a tenth aspect, an embodiment of this application provides a communications apparatus. The communications apparatus includes a processor and a storage medium. The storage medium stores instructions. When the instructions are run by the processor, the method for sending a sidelink channel state information report according to any one of the first aspect or the possible implementations of the first aspect is implemented.

According to an eleventh aspect, an embodiment of this application provides a communications apparatus. The communications apparatus includes a processor and a storage medium. The storage medium stores instructions. When the instructions are run by the processor, the method for sending a sidelink channel state information report according to any one of the second aspect or the possible implementations of the second aspect is implemented.

According to a twelfth aspect, an embodiment of this application provides a communications apparatus, including at least one processor. The at least one processor is coupled to a memory. The memory is configured to store a computer program or instructions. The at least one processor is configured to execute the computer program or the instructions in the memory, so that the communications apparatus performs the method for sending a sidelink channel state information report according to any one of the first aspect or the possible implementations of the first aspect.

According to a thirteenth aspect, an embodiment of this application provides a communications apparatus, including at least one processor. The at least one processor is coupled to a memory. The memory is configured to store a computer program or instructions. The at least one processor is configured to execute the computer program or the instructions in the memory, so that the communications apparatus performs the method for sending a sidelink channel state information report according to any one of the second aspect or the possible implementations of the second aspect.

Optionally, the communications apparatus according to the twelfth aspect or the thirteenth aspect further includes a memory.

According to a fourteenth aspect, an embodiment of this application provides a communications apparatus. The communications apparatus includes one or more modules, configured to implement the method in the first aspect or the second aspect. The one or more modules may correspond to steps of the method in the first aspect or the second aspect.

According to a fifteenth aspect, an embodiment of this application provides a chip. The chip includes a processor and a communications interface. The communications interface is coupled to the processor. The processor is configured to run a computer program or instructions, to implement the method for sending a sidelink channel state information report according to any one of the first aspect or the possible implementations of the first aspect. The communications interface is configured to communicate with another module outside the chip.

According to a sixteenth aspect, an embodiment of this application provides a chip. The chip includes a processor and a communications interface. The communications interface is coupled to the processor. The processor is configured to run a computer program or instructions, to implement the method for sending a sidelink channel state information report according to any one of the second aspect or the possible implementations of the second aspect. The communications interface is configured to communicate with another module outside the chip.

Specifically, the chip provided in this embodiment of this application further includes a memory, configured to store the computer program or the instructions.

Any apparatus, computer storage medium, computer program product, chip, or communications system provided above is configured to perform a corresponding method provided above. Therefore, for beneficial effects that can be achieved by the apparatus, computer storage medium, computer program product, chip, or communications system, refer to beneficial effects of a corresponding solution in the corresponding method provided above. Details are not described herein again.

BRIEF DESCRIPTION OF THE DRAWINGS

FIG. 4 to FIG. 9A and FIG. 9B are schematic flowcharts of methods for sending a sidelink channel state information report according to embodiments of this application;

DETAILED DESCRIPTION OF ILLUSTRATIVE EMBODIMENTS

Figure 1:
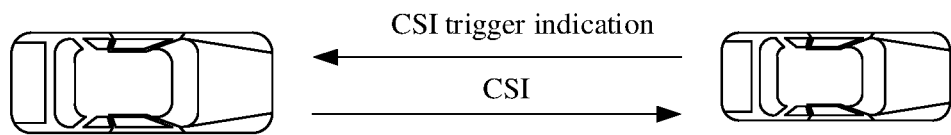
FIG. 1 is a schematic diagram of CSI report triggering according to an embodiment of this application.

To facilitate clear description of the technical solutions in the embodiments of this application, words such as "first" and "second" are used in the embodiments of this application to distinguish between same items or similar items that provide basically same functions or purposes. For example, "first terminal" and "first terminal" are merely intended to distinguish between different terminals, and do not limit a sequence of the terminals. A person skilled in the art may understand that the words such as "first" and "second" do not limit a quantity or an execution sequence, and the words such as "first" and "second" do not impose a limitation that objects modified by the words are necessarily different.

It should be noted that, in this application, the word "example" or "for example" is used to represent giving an example, an illustration, or a description. Any embodiment or design scheme described as "example" or "for example" in this application should not be explained as being more preferred or having more advantages than another embodiment or design scheme. Exactly, use of the word "example" or "for example" or the like is intended to present a relative concept in a specific manner.

In this application, "at least one" means "one or more", and "a plurality of" means "two or more". The term "and/or" describes an association relationship between associated objects and represents that three relationships may exist. For example, A and/or B may represent the following three cases: Only A exists, both A and B exist, and only B exists, where each of A and B may be singular or plural. The character "/" generally indicates an "or" relationship between associated objects. "At least one of the following (items)" or a similar expression thereof means any combination of these items, including a single item (item) or any combination of a plurality of items (items). For example, at least one of a, b, or c may represent: a; b; c; a and b; a and c; b and c; or a, b, and c, where each of a, b, and c may be singular or may be plural.

The technical solutions in this application may be applied to various communications systems, for example, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communications system, a public land mobile network (public land mobile network, PLMN) system, a device-to-device (device to device, D2D) network system or a machine-to-machine (machine to machine, M2M) network system, and a future 5G communications system.

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may know that, with evolution of the network architecture and emergence of new service scenarios, the technical solutions provided in the embodiments of this application are also applicable to similar technical issues. In the embodiments of this application, an example in which a provided method is applied to an NR system or a 5G network is used for description.

Before the embodiments of this application are described, terms in the embodiments of this application are first described.

(1) A sidelink (sidelink, SL) is defined for direct communication between terminals. To be specific, a sidelink is a link for communication performed between terminals without forwarding by a base station.

(2) A sidelink resource is a resource for transmission of control information and data between a terminal 1 and a terminal 2 on a sidelink.

The following describes the technical solutions in this application with reference to the accompanying drawings.

Figure 2:
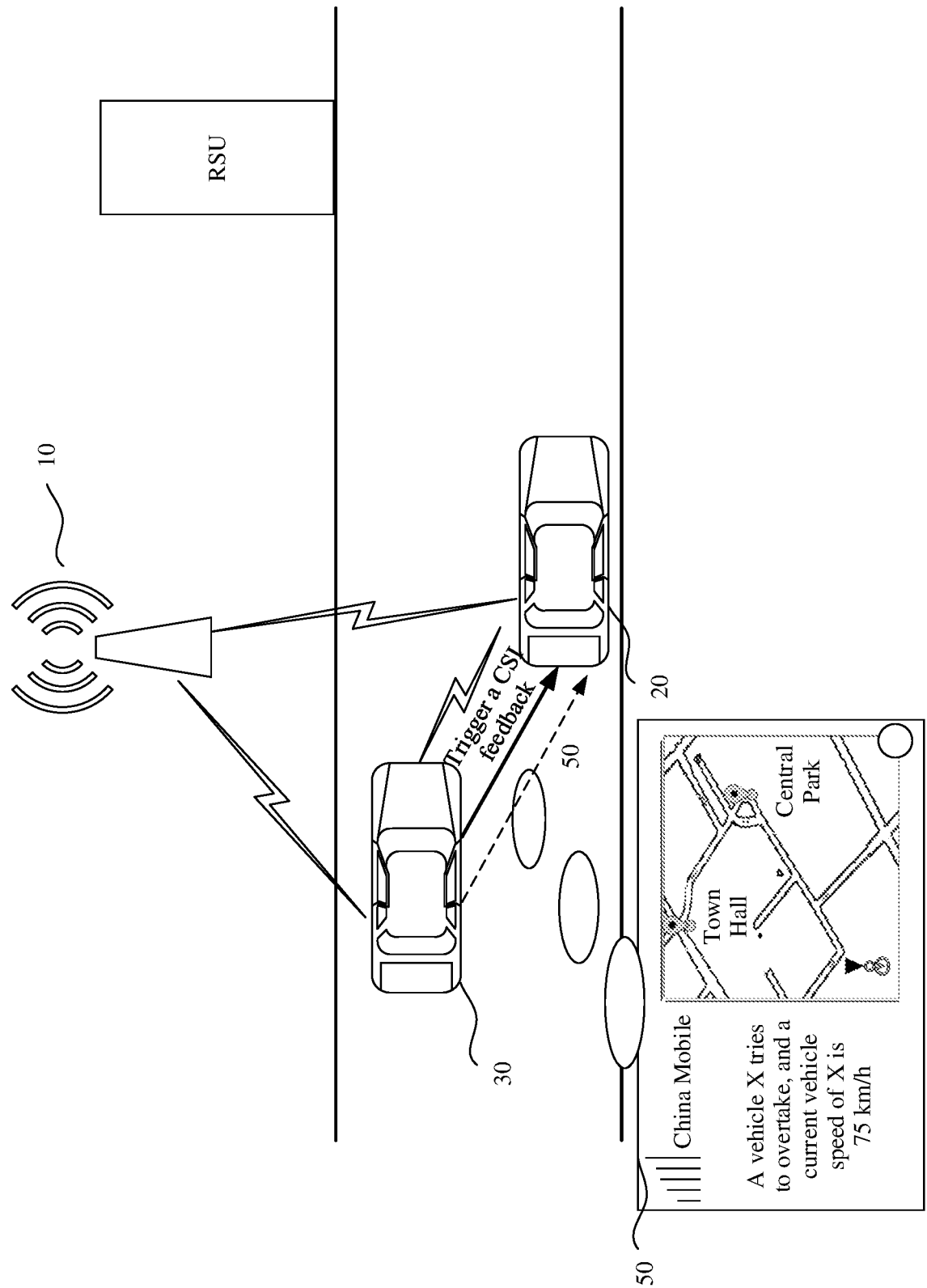
FIG. 2 is a system architectural diagram of a communications system according to an embodiment of this application.

FIG. 2 shows a communications system to which a method for sending a sidelink channel state information report according to an embodiment of this application is applied. The communications system includes one or more network devices (for example, a network device 10 shown in FIG. 2) and one or more terminals (for example, a first terminal 20 and a second terminal 30 shown in FIG. 2). In FIG. 2, an example in which the terminal is a vehicle is used.

The first terminal 20 communicates with the network device 10, and the first terminal 20 communicates with the second terminal 30. Certainly, the second terminal 3 may also communicate with the network device 10.

In a possible specific implementation, the communications system shown in FIG. 2 may further include a core network. The network device 10 may be connected to the core network. The core network may be a 4G core network (for example, evolved packet core (evolved packet core, EPC)), a 5G core network (5G core, 5GC), or a core network in various future communications systems. The communications system may further include a roadside unit (roadside unit, RSU). The RSU may further provide access to various types of service information and data networks for each terminal in the system. Using an example in which the terminal is a vehicle, for example, the RSU may further provide functions such as electronic toll collection and in-vehicle entertainment for each terminal in the system, thereby greatly improving traffic intelligence.

Using an example in which the core network may be the 4G core network, the network device 10 may be an evolved NodeB (evolved NodeB, eNB or eNodeB) in a 4G system, the first terminal 20 is a terminal that can perform information transmission with the eNB, and the eNB accesses the EPC network through an Si interface.

Using an example in which the core network may be the 5G core network, the network device 10 may be a next generation NodeB (the next generation node B, gNB) in an NR system, the first terminal 20 is a terminal that can perform information transmission with the gNB, and the gNB accesses the 5GC through an NG interface.

Certainly, the network device 10 may alternatively be a 3rd generation partnership project (3rd generation partnership project, 3GPP) protocol base station, or may be a non-3GPP protocol base station.

There is a first transmission link between the network device 10 and the first terminal 20. For example, the first transmission link may be a Uu link. There is a second transmission link between the first terminal 20 and the second terminal 30. For example, the second transmission link may be a sidelink. The Uu link is used to transmit a Uu service (information or data) sent by the network device 10 to the first terminal 20.

The first terminal 20 and the second terminal 30 may perform V2X service transmission with each other on the sidelink, where a V2X service may also be referred to as sidelink data or sidelink control information (for example, the following sidelink CSI report). The first terminal 20 may transmit an uplink (uplink, UL) Uu service to the network device 10 on the Uu link, and may also receive, on the Uu link, a downlink (downlink, DL) Uu service sent by the network device 10.

An interface through which the first terminal 20 and the second terminal 30 directly communicate with each other may be an interface 1. For example, the interface 1 may be referred to as a PC5 interface, and uses an internet of vehicles dedicated frequency band (for example, 5.9 GHz). An interface between the first terminal 20 and the network device 10 may be referred to as an interface 2 (for example, a Uu interface), and uses a cellular network frequency band (for example, 1.8 GHz). The PC5 interface is usually used for V2X, or a scenario in which direct communication can be performed between devices, for example, D2D.

Names of the interface 1 and the interface 2 are merely examples. Names of the interface 1 and the interface 2 are not limited in this embodiment of this application.

FIG. 2 shows a scenario according to an embodiment of this application. As shown in FIG. 2, an example in which the second terminal 30 is a vehicle whose identifier is X (briefly referred to as a vehicle X) is used. If the vehicle X determines to perform an overtaking operation, the vehicle X may send, on a sidelink resource 1, sidelink data (for example, the sidelink data may be an overtaking indication and a current vehicle speed (for example, 75 km/h) of the vehicle X) in a dialog box 50 to the first terminal 20 (for example, a vehicle whose identifier is Y (briefly referred to as a vehicle Y)) located in front of the vehicle X, so that the vehicle Y slows down after receiving the current vehicle speed of X and the overtaking indication, to allow X to safely overtake the vehicle Y. Before the second terminal 30 sends the sidelink data to the first terminal 20, the second terminal 30 may set a modulation and coding scheme used for the sidelink data. Based on this, a sidelink channel state information (Channel State Information, CSI) feedback mechanism is introduced. To be specific, the second terminal 30 triggers, by using sidelink control information (Sidelink Control Information, SCI), the first terminal 20 to send CSI of the sidelink between the first terminal 20 and the second terminal 30. In addition, the second terminal 30 sends a channel state information-reference signal (Channel State Information-Reference Signal, CSI-RS) to the first terminal 20, and the CSI-RS is used by the first terminal 20 to perform measurement to obtain the CSI that is to be fed back.

The scenario shown in FIG. 2 is merely an example. The solutions in this application are also applicable to another scenario of communication between terminals.

Usually, a V2X service is transmitted on a sidelink resource on a sidelink, and a Uu service is transmitted on a Uu resource on a Uu link.

The first terminal 20 or the second terminal 30 is a device that has a wireless communication function, and may be deployed on land in manners including an indoor or outdoor manner and a handheld or vehicle-mounted manner; may be deployed on water (for example, on a ship); or may be deployed in the air (for example, on an airplane, a balloon, or a satellite). The terminal is also referred to as user equipment (user equipment, UE), a mobile station (mobile station, MS), a mobile terminal (mobile terminal, MT), a terminal device, and the like, and is a device that provides voice and/or data connectivity for a user. For example, the terminal includes a handheld device or vehicle-mounted device that has a wireless connection function. Currently, the terminal may be a mobile phone (mobile phone), a tablet computer, a notebook computer, a palmtop computer, a mobile Internet device (mobile internet device, MID), a wearable device (for example, a smartwatch, a smart band, or a pedometer), a vehicle-mounted device (for example, a car, a bicycle, an electric vehicle, an airplane, a ship, a train, or a high-speed train), a virtual reality (virtual reality, VR) device, an augmented reality (augmented reality, AR) device, a wireless terminal in industrial control (industrial control), a smart household device (for example, a refrigerator, a television, an air conditioner, or an electricity meter), an intelligent robot, a workshop device, a wireless terminal in self-driving (self-driving), a wireless terminal in remote surgery (remote surgery), a wireless terminal in a smart grid, a wireless terminal in transportation safety (transportation safety), a wireless terminal in a smart city (smart city), a wireless terminal in a smart home (smart home), a flight device (for example, an intelligent robot, a hot air balloon, a drone, or an airplane), or the like. In a possible application scenario of this application, a terminal device is a terminal device that often works on the ground, for example, a vehicle-mounted device. In this application, for ease of description, a chip, for example, a system-on-a-chip (System-On-a-Chip, SOC), a baseband chip, or another chip that has a communication function, deployed in the foregoing device may also be referred to as a terminal.

The first terminal 20 or the second terminal 30 may be a vehicle that has a corresponding communication function, a vehicle-mounted communications apparatus, or another embedded communications apparatus, or may be a user-handheld communications device, including a mobile phone, a tablet computer, or the like.

For example, the terminal is a vehicle. Currently, a vehicle may obtain road condition information or receive an information service in a timely manner through vehicle to vehicle (vehicle to vehicle, V2V) communication, vehicle to infrastructure (vehicle to infrastructure, V2I) communication (for example, infrastructure is a roadside unit (roadside unit, RSU)), vehicle to pedestrian (vehicle to pedestrian, V2P) communication, or vehicle to network (vehicle to network, V2N) communication. These communication manners may be collectively referred to as V2X communication (where X represents everything). In the foregoing communication, a network used for V2X communication is usually referred to as an internet of vehicles.

When the solutions described in the embodiments of this application are applied to a V2X scenario, the solutions may be applied to the following fields: self-driving (unmanned driving), automated driving (automated driving/ADS), assisted driving (drivingassistance/ADAS), intelligent driving (intelligent driving), connected driving (connected driving), intelligent connected driving (Intelligent connected driving), and car sharing (car sharing).

For example, in this embodiment of this application, the terminal may alternatively be a wearable device. The wearable device may also be referred to as a wearable intelligent device, and is a general name of wearable devices developed by performing intelligence design on daily wear, for example, glasses, gloves, a watch, clothes, and shoes, by using a wearable technology. The wearable device is a portable device that is directly worn, or integrated into clothes or an accessory of a user. The wearable device is a hardware device, and further implements a powerful function through software support, data interaction, and cloud interaction. In a broad sense, wearable intelligent devices include devices that have full functions and large sizes and that can implement complete or partial functions without relying on a smartphone, for example, a smartwatch or smart glasses; and devices that focus only on a specific type of application function and that need to be used in conjunction with another device such as a smartphone, for example, various smart bands and smart jewelry for physical sign monitoring.

The network device 10 is an entity that is used in conjunction with the first terminal 20 and that may be configured to transmit or receive a signal. For example, the network device may be an access point (access point, AP) in a WLAN, may be an evolved NodeB (evolved NodeB, eNB or eNodeB), a relay station, or an access point in long term evolution (long term evolution) LTE, may be a vehicle-mounted device or a wearable device, or may be a network device in a future 5G network, or a network device in a future evolved PLMN.

In addition, in this embodiment of the present invention, the network device provides a service for a cell, and the terminal communicates with the network device by using a transmission resource (for example, a time domain resource, a frequency domain resource, or a time-frequency resource) used by the cell. The cell may be a cell corresponding to the network device (for example, a base station). The cell may be served by a macro base station, or may be served by a base station corresponding to a small cell (small cell). The small cell herein may be a metro cell (metro cell), a micro cell (micro cell), a pico cell (Pico cell), a femto cell (femto cell), or the like. These small cells are characterized by small coverage areas and low transmit power, and are suitable for providing high-rate data transmission services.

Figure 3:
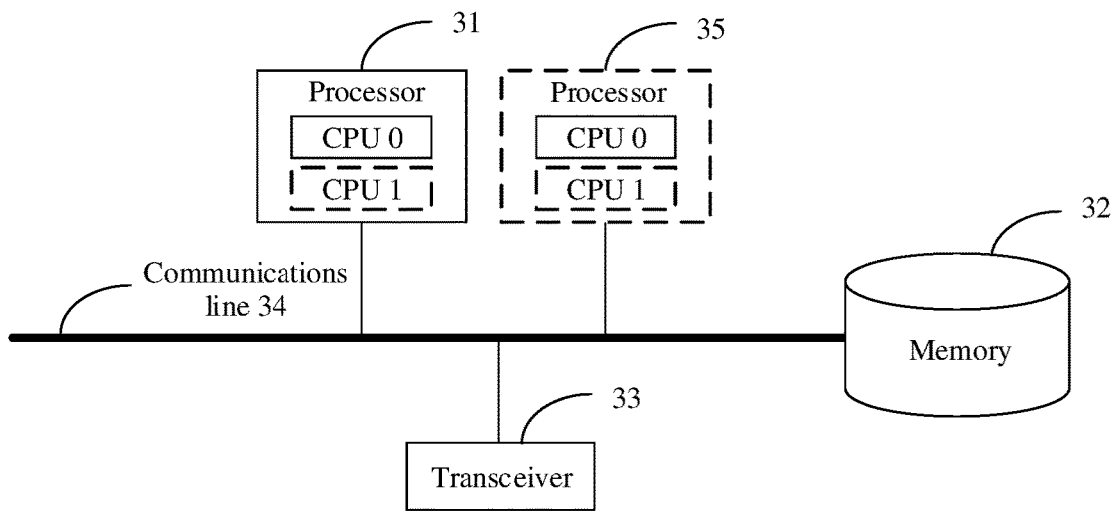
FIG. 3 is a schematic structural diagram of a communications device according to an embodiment of this application.

FIG. 3 is a schematic diagram of a hardware structure of a communications device according to an embodiment of this application. For hardware structures of the first terminal 20, the second terminal 30, and the network device 10 in the embodiment of this application, refer to the structure shown in FIG. 3. The communications device includes a processor 31, a communications line 34, and at least one transceiver (FIG. 3 is described by using only an example in which a transceiver 33 is included).

The processor 31 may be a general-purpose central processing unit (central processing unit, CPU), a microprocessor, an application-specific integrated circuit (application-specific integrated circuit, ASIC), or one or more integrated circuits that are configured to control program execution of the solutions in this application.

The communications line 34 may include a path for information transfer between the foregoing components.

The transceiver 33 is any apparatus of a transceiver type, and is configured to communicate with another device or a communications network, for example, an Ethernet network, a radio access network (radio access network, RAN), or a wireless local area network (wireless local area network, WLAN).

Optionally, the communications device may further include a memory 32.

The memory 32 may be a read-only memory (read-only memory, ROM), another type of static storage device that can store static information and instructions, a random access memory (random access memory, RAM), or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact optical disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, the memory is not limited thereto. The memory may exist independently, and be connected to the processor by using the communications line 34. Alternatively, the memory may be integrated with the processor.

The memory 32 is configured to store computer executable instructions for executing the solutions in this application, and the processor 31 controls the execution. The processor 31 is configured to execute the computer executable instructions stored in the memory 32, to implement a policy control method provided in the following embodiments of this application.

Optionally, the computer executable instructions in this embodiment of this application may also be referred to as application program code. This is not specifically limited in this embodiment of this application.

During specific implementation, in an embodiment, the processor 31 may include one or more CPUs, for example, a CPU0 and a CPU1 in FIG. 3.

During specific implementation, in an embodiment, the communications device may include a plurality of processors, for example, the processor 31 and a processor 35 in FIG. 3. Each of the processors may be a single-core (single-CPU) processor, or may be a multi-core (multi-CPU) processor. The processor herein may be one or more devices, circuits, and/or processing cores configured to process data (for example, a computer program instruction).

To transmit a V2X service, the terminal needs to obtain a sidelink resource. Currently, there are two sidelink resource allocation manners.

One of the two manners is a resource allocation manner that is based on scheduling by the network device 10. To be specific, the network device 10 schedules, for the first terminal 20, a sidelink resource used to transmit sidelink data or sidelink control information. This manner may also be referred to as a mode (mode) 1.

The other manner is an allocation manner in which the first terminal 20 autonomously selects a resource from a resource pool. To be specific, the first terminal 20 autonomously selects a sidelink resource from a resource pool that is configured or preconfigured by the network device 10 by using a system message or dedicated signaling, to transmit sidelink data or sidelink control information on the autonomously selected sidelink resource. The resource pool includes one or more sidelink resources.

When the first terminal 20 needs to transmit sidelink data and is in an RRC connected mode, to obtain a sidelink resource, the first terminal 20 may report, to the network device 10 by using an RRC message, a destination identifier of a communication peer terminal (for example, the second terminal 30), a communication transmission manner (one of broadcast, multicast, and unicast), and quality of service (quality of service, QoS) information of the to-be-transmitted sidelink data. After receiving the RRC message, the network device 10 configures, for the first terminal 20, a sidelink resource allocation manner and a related dedicated configuration of sidelink communication. The dedicated configuration of sidelink communication includes a configuration of a sidelink radio bearer. If the resource allocation manner configured by the network device 10 for the first terminal 20 is the mode 1, the network device 10 configures, for each sidelink radio bearer, a scheduling request (scheduling request, SR) configuration and a scheduling request resource that are mapped to the radio bearer and that are used to request a sidelink resource. The scheduling request configuration includes an identifier of the scheduling request configuration, a maximum quantity of transmission times of a scheduling request, and a disable timer of the scheduling request. The scheduling request resource includes physical-layer time/frequency domain resource configuration information for sending the scheduling request. When the first terminal 20 has sidelink data to send, a sidelink BSR is triggered. If the first terminal 20 has no available uplink (uplink, UL) resource for transmitting the sidelink BSR, the first terminal 20 further triggers sending, to the network device 10, an SR used to request a sidelink resource. The first terminal 20 sends the SR by using a corresponding SR configuration and SR resource. Then, after receiving the SR, the network device 10 may allocate the sidelink resource to the first terminal 20. In addition, to enable the first terminal 20 to send the sidelink BSR, the network device 10 may further allocate an uplink resource to the first terminal 20 based on the SR.

After the second terminal 30 triggers the first terminal 20 to feed back the sidelink CSI, the first terminal 20 transmits the CSI to the second terminal 30 by using media access control layer control information (Medium Access Control Control Element, MAC CE). The CSI in this embodiment of this application may be the CSI of the sidelink between the first terminal 20 and the second terminal 30.

The first terminal 20 may send the MAC CE that includes the CSI to the second terminal 30 on the sidelink resource. In other words, to send the MAC CE that includes the CSI, the first terminal 20 first needs to obtain the sidelink resource. However, when preparing to send the MAC CE that includes the CSI, the first terminal 20 may have no sidelink resource. In addition, although the sidelink resource requested based on the sidelink BSR not only can be used to transmit sidelink data, but also can be used to transmit RRC layer control signaling of a PC5 interface, yet when the MAC CE (media access control (Medium Access Control, MAC) layer control signaling) needs to be transmitted, the BSR and the SR cannot be triggered to request the base station to allocate the sidelink resource. Therefore, when the first terminal 20 needs to send the MAC CE that includes the sidelink CSI, if the first terminal 20 has no sidelink resource, the first terminal 20 cannot obtain the sidelink resource based on the foregoing sidelink communication procedure. Therefore, the first terminal 20 may wait until the first terminal 20 has sidelink data that needs to be sent, before requesting the sidelink resource from the base station by triggering the sidelink BSR and the SR. In this case, there may be the following problems:

Case 1: The first terminal 20 has no data that needs to be sent to the second terminal 30. As a result, the first terminal 20 cannot obtain any sidelink resource for CSI transmission.

Case 2: After the first terminal 20 determines that the MAC CE that includes the CSI needs to be sent, first duration elapses before the sidelink data to be sent to the second terminal 30 arrives at the first terminal 20 and the first terminal 20 obtains the sidelink resource. However, if the first duration is greater than a maximum allowed transmission delay of the CSI, after the MAC CE that includes the CSI is sent to the second terminal 30 by using the sidelink resource, the CSI is of no value for reference for selecting, by the second terminal 30, an MCS used for data transmission.

In view of the foregoing problems, the following describes in detail a method for sending a sidelink channel state information CSI report provided in the embodiments of this application, with reference to FIG. 4 to FIG. 10.

It should be noted that names of messages between network elements, names of parameters in the messages, and the like in the following embodiments of this application are merely examples, and may alternatively be other names during specific implementation. This is not specifically limited in the embodiments of this application.

It should be noted that cross reference may be made between the embodiments of this application. For example, for same or similar steps, cross reference may be made between method embodiments, communications system embodiments, and apparatus embodiments. This is not limited.

In the embodiments of this application, a specific structure of an execution body of the method for sending a sidelink channel state information CSI report is not specifically limited in the embodiments of this application, provided that a program that records code of the method for sending a sidelink channel state information CSI report in the embodiments of this application can be run to perform communication according to the method for sending a sidelink channel state information CSI report in the embodiments of this application. For example, the method for sending a sidelink channel state information CSI report provided in the embodiments of this application may be performed by a functional module that can invoke and execute a program and that is in a first terminal, or a communications apparatus, for example, a chip, applied to a first terminal. The method for sending a sidelink channel state information CSI report provided in the embodiments of this application may be performed by a functional module that can invoke and execute a program and that is in a base station, or a communications apparatus, for example, a chip, applied to a base station. This is not limited in this application. The following embodiment is described by using an example in which the method for sending a sidelink channel state information CSI report is performed by the first terminal.

Figure 4:
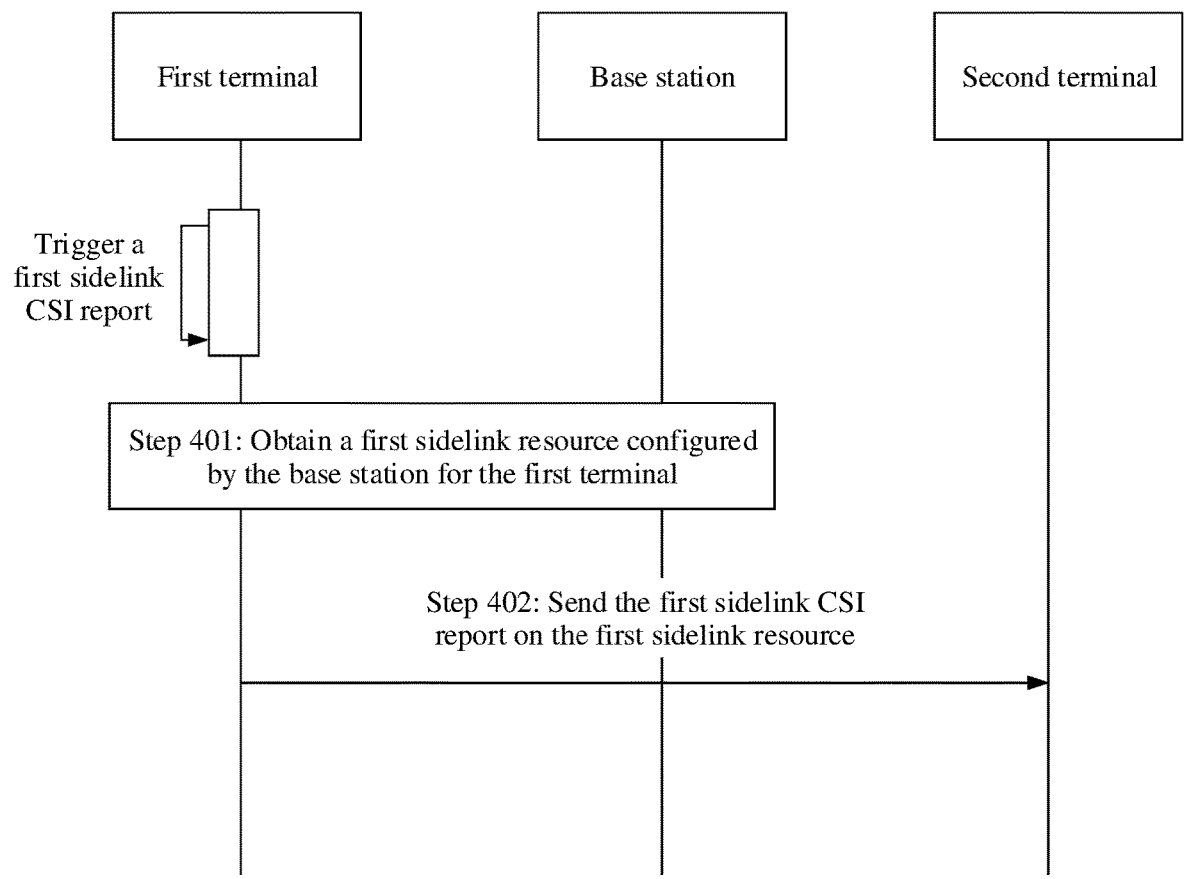

FIG. 4 shows a method for sending a sidelink channel state information CSI report according to an embodiment of this application. The method includes the following steps.

Step 401: When a first sidelink channel state information CSI report is triggered, a base station sends, to a first terminal 20, a first sidelink resource configured for the first terminal 20, so that the first terminal 20 obtains the first sidelink resource configured by the base station for the first terminal 20.

For example, the base station may correspond to the network device 10 in the communications system shown in FIG. 2.

The first sidelink CSI report is used by the first terminal 20 to feed back, to a second terminal 30, CSI of a sidelink between the first terminal 20 and the second terminal 30. The first sidelink resource can be used to transmit the sidelink CSI report.

In this embodiment of this application, the first sidelink resource may have the following meanings: (1) The first sidelink resource is a sidelink resource that is dedicated to transmitting the sidelink CSI report and that is configured or allocated by the base station for or to the first terminal 20. In other words, on the first sidelink resource, the first terminal 20 may send any sidelink CSI report, not limited to sending the first sidelink CSI report. (2) Alternatively, the first sidelink resource is specially configured or allocated for sending the first sidelink CSI report. (3) Alternatively, the first sidelink resource not only can be used to transmit the sidelink CSI report, but also can be used to transmit sidelink data or control information other than a sidelink CSI report. This is not limited in this embodiment of this application.

To sum up, the first sidelink resource configured by the base station for the first terminal 20 can be used by the first terminal 20 to send the first sidelink CSI report.

Step 402: The first terminal 20 sends the first sidelink CSI report to the second terminal 30 on the first sidelink resource, so that the second terminal 30 receives the first sidelink CSI report from the first terminal 20.

For example, the first sidelink CSI report in this embodiment of this application may be carried in first signaling. For example, the first signaling may be a MAC CE. The first signaling in this embodiment of this application may be carried in a media access control protocol data unit (medium access protocol data unit, MAC PDU). In other words, the MAC PDU includes the first sidelink CSI report. In this embodiment of this application, the MAC PDU that includes the first sidelink CSI report or the MAC PDU that includes the first signaling may be referred to as a first MAC PDU. The following uses the first MAC PDU for description. This is noted herein for once and for all, and is not repeated in the following.

It may be understood that, after the first terminal 20 obtains the first sidelink resource, the first terminal 20 generates the first signaling that includes the first sidelink CSI report, and cancels the triggered first sidelink CSI report.

This embodiment of this application provides the method for sending a sidelink channel state information CSI report. In the method, when the first sidelink channel state information CSI report is triggered, the first terminal obtains the first sidelink resource that is configured by the base station for the first terminal and that is used to transmit the sidelink CSI report. In this way, the first terminal can send the first sidelink CSI report to the second terminal on the first sidelink resource in a timely manner, so that the second terminal sets a modulation and coding scheme of sidelink data in a timely manner based on the CSI of the sidelink between the first terminal and the second terminal. The method can avoid a prior-art case in which there is no available sidelink resource used for CSI feedback.

In a possible embodiment, before step 401, the method provided in this embodiment of this application may further include: The first terminal 20 triggers the first sidelink CSI report.

Figure 5:
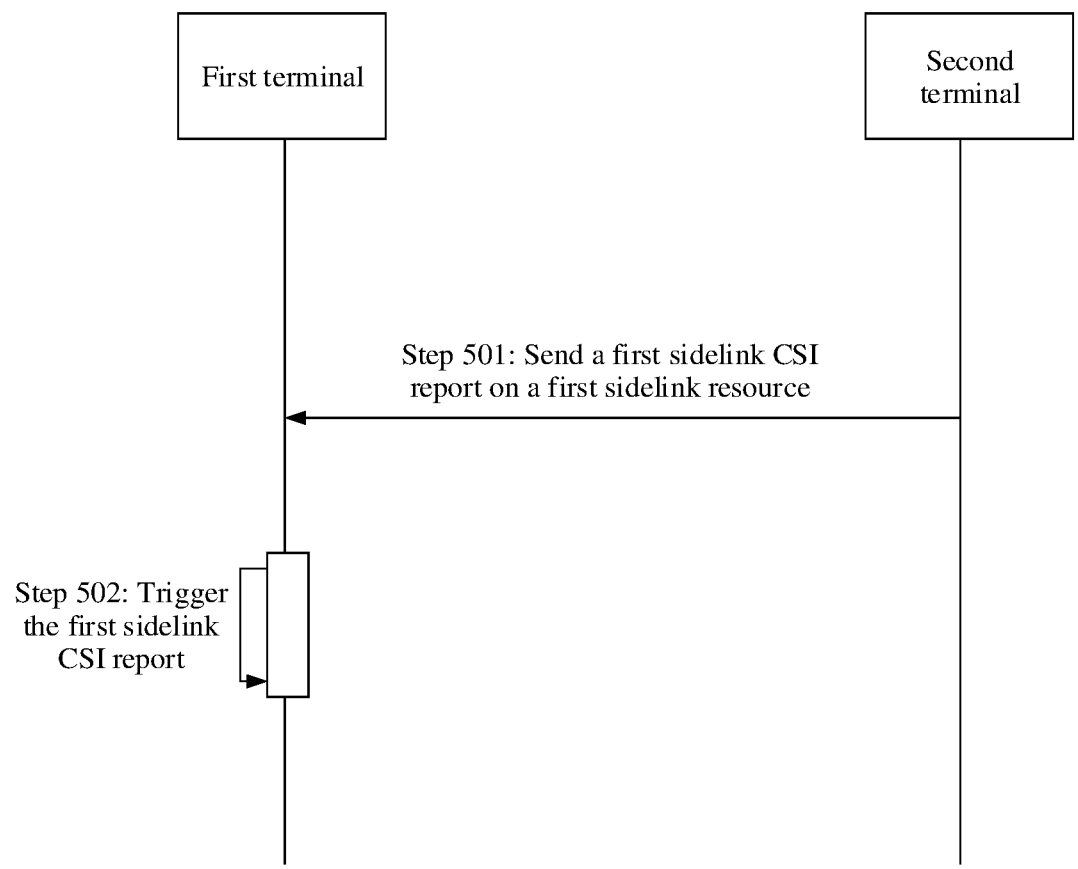

For an implementation process in which the first terminal 20 triggers the first sidelink CSI report, refer to the following descriptions in FIG. 5.

As shown in FIG. 5, an embodiment of this application provides a method for triggering the first sidelink CSI report. The method includes the following steps.

Step 501: The second terminal 30 sends, to the first terminal 20, indication information for triggering CSI feedback, so that the first terminal 20 receives the indication information for triggering CSI feedback.

Specifically, the indication information for triggering CSI feedback may be included in SCI sent by the second terminal 30 to the first terminal 20.

Step 502: The first terminal 20 triggers the first sidelink channel state information CSI report based on the indication information for triggering CSI feedback.

In a specific implementation, after receiving the indication information for triggering CSI feedback, a physical layer of the first terminal 20 notifies the reception to a MAC layer of the first terminal 20. After the MAC layer of the first terminal 20 receives the notification from the physical layer, the MAC layer of the first terminal 20 triggers the first sidelink CSI report. After the first sidelink CSI report is triggered and before the first sidelink CSI report is canceled, it is considered that a state of the first sidelink CSI report is to be determined.

In this embodiment of this application, the first terminal 20 may obtain, in any one of manners described in FIG. 6A and FIG. 6B to FIG. 8, the first sidelink resource configured by the base station for the first terminal 20. The following describes each of the manners.

Example (1): The base station dynamically schedules the first sidelink resource for the first terminal 20.

When the first sidelink CSI report is triggered, the first terminal 20 may send a first SR and/or a sidelink (Sidelink Buffer Status Report, SL-BSR) to the base station, to obtain the first sidelink resource. However, before sending the first SR, the first terminal 20 first needs to obtain a first SR configuration and a first SR resource for sending the first SR.

In an implementation, the first terminal 20 may obtain, in the following manners, the first SR configuration and the first SR resource for sending the first SR.

In a first manner, the first SR configuration and the first SR resource are configured in the first terminal 20. The first SR configuration and the first SR resource are associated with a specific SR. The specific SR is used to request a sidelink resource for transmitting the sidelink CSI report.

In a second manner, the first terminal 20 may request the first SR configuration and the first SR resource from the base station.

For a process in which the first terminal 20 requests the first SR configuration and the first SR resource from the base station, refer to the following descriptions in step 601 to step 603.

Figure 6A:
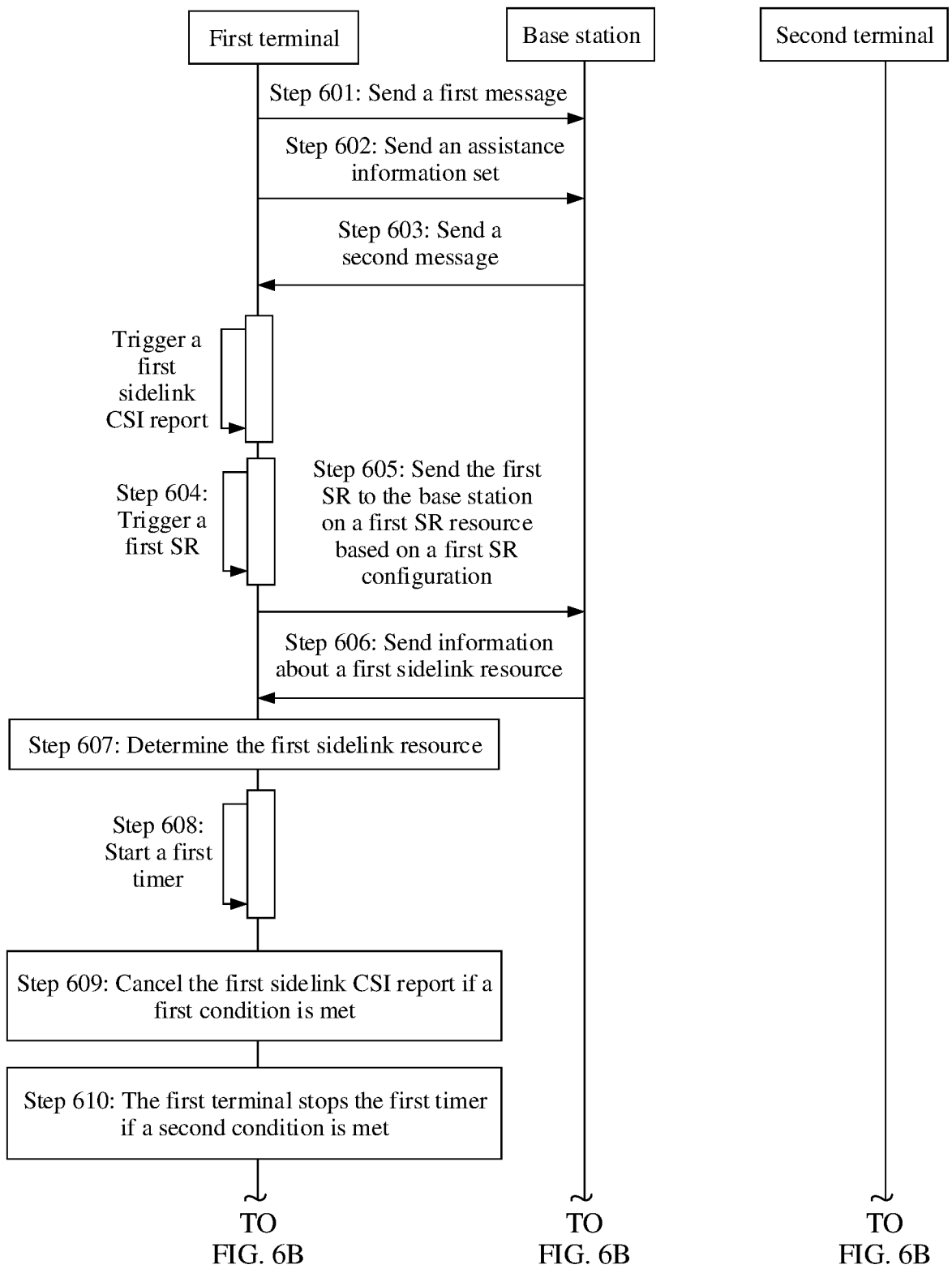
Figure 6B:
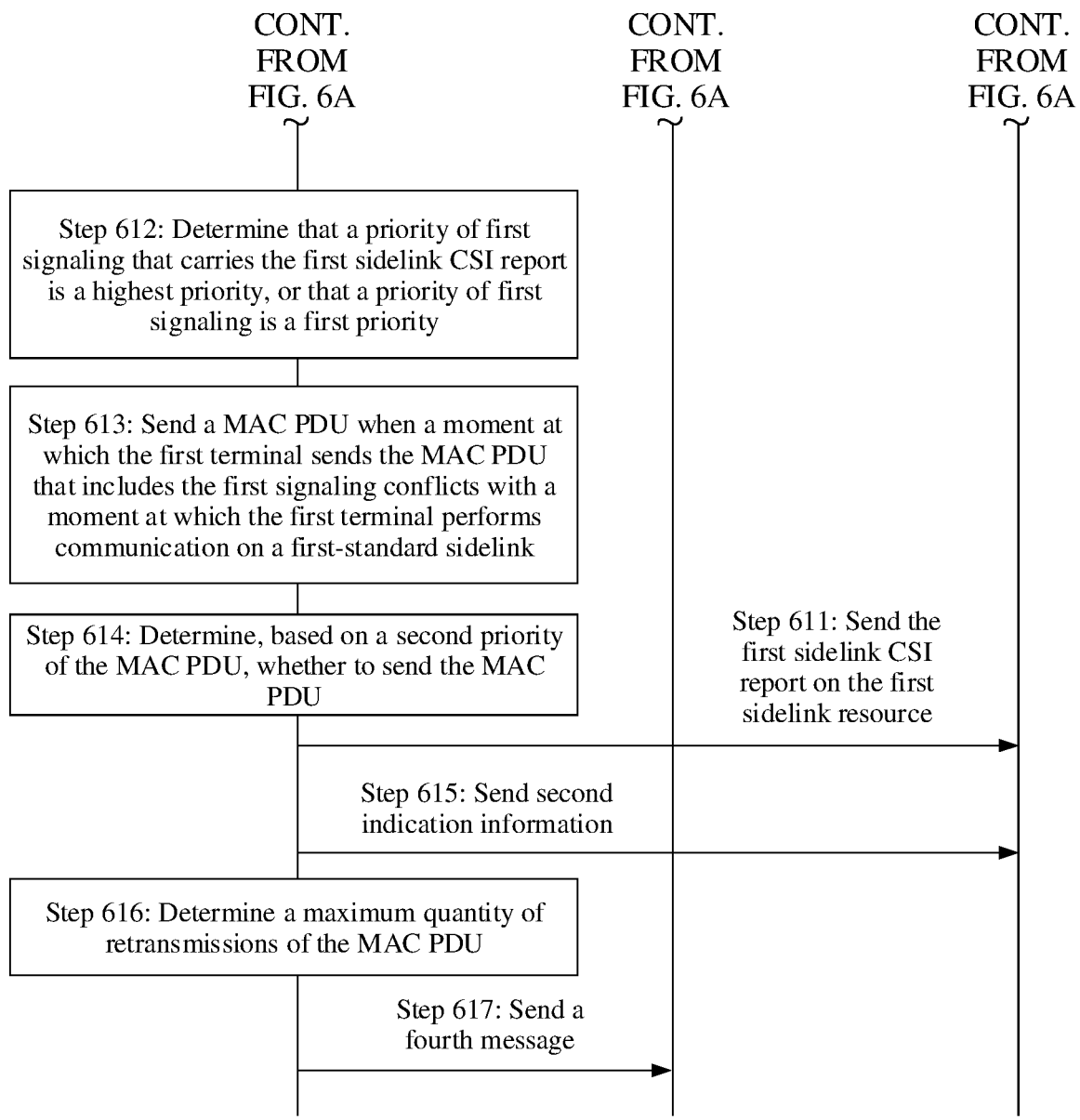

In a possible embodiment, as shown in FIG. 6A and FIG. 6B, before step 401, that is, before the first sidelink CSI report is triggered, the method provided in this embodiment of this application may further include the following steps.

Step 601: The first terminal 20 sends a first message to the base station, so that the base station receives the first message from the first terminal 20.

The first message is used to indicate that the first terminal 20 needs to send a sidelink CSI report.

In a specific implementation, the first message may be a sidelink terminal SidelinkUEInformation message, a UEAssistanceInformation message, or a newly defined RRC message. This is not limited in this embodiment of this application.

In a specific implementation, the first message includes first indication information. The first indication information may have the following meanings:

First meaning: The first indication information is used to indicate the first terminal 20 to request the first SR configuration and the first SR resource from the base station, where the first SR configuration and the first SR resource are used to request, from the base station, a sidelink resource for transmitting the sidelink CSI report.

Second meaning: The first indication information is used to indicate that the first terminal 20 needs to send a sidelink CSI report or needs to send the first sidelink CSI report.

In this embodiment of this application, the sidelink CSI report that needs to be sent by the first terminal 20 may be the first sidelink CSI report, or may be another sidelink CSI report.

In a specific implementation, the first message may further include an identifier of the second terminal 30. The identifier of the second terminal 30 may be a destination identifier of the second terminal 30. In this way, the first terminal 20 can indicate, to the base station by using the first message, that the requested first SR configuration and first SR resource are associated with the second terminal 30. In other words, the SR subsequently sent by the first terminal 20 based on the first SR configuration and the first SR resource is used to request a sidelink resource for sending a sidelink CSI report to the second terminal 30.

Based on this, the first meaning of the first indication information may be further understood as follows: The first indication information is used to indicate the first terminal 20 to request the first SR configuration and the first SR resource from the base station, where the first SR configuration and the first SR resource are used to request, from the base station, a sidelink resource for sending a sidelink CSI report to the second terminal 30. The second meaning may be further understood as follows: The first indication information is used to indicate that the first terminal 20 needs to send a sidelink CSI report to the second terminal 30.

Step 602: The first terminal 20 sends an assistance information set to the base station, so that the base station receives the assistance information set from the first terminal 20.

The assistance information set includes at least one of the following information: a maximum allowed delay of the first sidelink CSI report, hybrid automatic repeat request (Hybrid Automatic Repeat Request, HARQ) feedback configuration information of the first sidelink CSI report, a maximum quantity of retransmissions of the first sidelink CSI report, a length of the first signaling for transmitting the first sidelink CSI report, and a period and a time offset value for transmitting the first sidelink CSI report. The HARQ feedback configuration information is used to configure whether HARQ feedback is required for transmission of the first sidelink CSI report.

Optionally, the assistance information set may further include second assistance information: a period and a time offset value for sending the CSI by the first terminal 20 to the second terminal 30. The period and the time offset value of the CSI may be autonomously determined by the first terminal 20, or may be determined by the first terminal 20 based on sixth information from the second terminal 30.

The maximum allowed delay means a maximum waiting time from a moment at which the CSI report is triggered to a moment at which the first terminal 20 sends the first sidelink CSI report to the second terminal 30, after the first terminal 20 receives, from the second terminal 30, an indication for triggering CSI feedback.

In one aspect, content of the assistance information set may be autonomously determined by the first terminal 20. For example, the first terminal 20 determines, by itself, whether to indicate the second terminal to feed back HARQ information for the first sidelink CSI report; the first terminal 20 determines, by itself, the maximum quantity of retransmissions of the first sidelink CSI report and the length of the first signaling for transmitting the first sidelink CSI report. The HARQ information is used to indicate whether the first signaling for transmitting the first sidelink CSI report is correctly received.

In another aspect, content of the assistance information set may be alternatively indicated by the second terminal 30 to the first terminal 20. For a process in which the first terminal 20 determines the assistance information set based on an indication from the second terminal 30, refer to descriptions in FIG. 10 in the following embodiment. Details are not described herein.

In a possible embodiment, before the first terminal 20 sends the first message to the base station, the method provided in this embodiment of this application may further include: The first terminal 20 triggers reporting of the first message.

Figure 7:
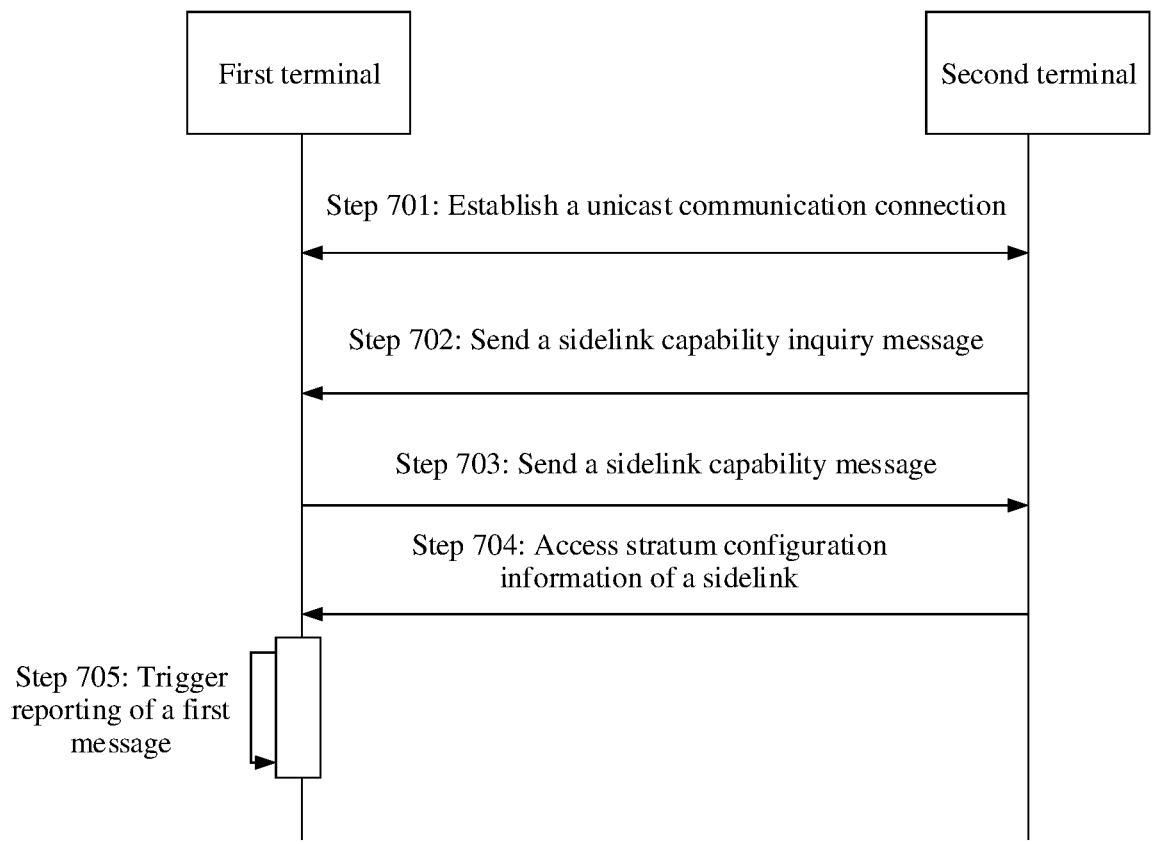

For a specific implementation process in which the first terminal 20 triggers reporting of the first message, refer to a method shown in FIG. 7. FIG. 7 provides the method for triggering, by the first terminal 20, reporting of the first message. The method includes the following steps.

Step 701: Establish a unicast communication connection between the first terminal 20 and the second terminal 30.

For specific implementation of step 701, refer to descriptions in the prior art, and details are not described herein.

Step 702: The second terminal 30 sends a sidelink capability inquiry message to the first terminal 20, so that the first terminal 20 receives the sidelink capability inquiry message.

Optionally, if the second terminal 30 supports CSI-RS sending, the second terminal 30 adds the following capability information to the sidelink capability inquiry message: The second terminal 30 supports CSI-RS sending.

Step 703: The first terminal 20 sends a sidelink capability message to the second terminal 30, so that the second terminal 30 receives the sidelink capability message.

If the first terminal 20 supports sidelink CSI feedback to the second terminal, the first terminal 20 adds the following capability information to the sidelink capability message: The first terminal 20 supports sidelink CSI feedback. Alternatively, only if the second terminal 30 indicates, in the sidelink capability inquiry message, that the second terminal 30 supports CSI-RS sending, the first terminal 20 adds a first indication to the sidelink capability message, where the first indication indicates that the first terminal 20 supports sidelink CSI feedback. Otherwise, the first terminal 20 does not add a first indication to the sidelink capability message.

Step 704: The second terminal 30 sends access stratum configuration information of the sidelink to the first terminal 20, so that the first terminal 20 receives the access stratum configuration information of the sidelink. The access stratum configuration information is carried by a PC5 RRC message. The access stratum configuration information includes at least one of the following information:

first information, used to indicate a CSI-RS pattern (pattern) that is to be sent by the second terminal 30 to the first terminal 20;

second information, indicating the maximum allowed delay of the first sidelink CSI report that is to be sent by the first terminal 20 to the second terminal 30;

third information, indicating whether first sidelink CSI supports HARQ information feedback or does not support HARQ information feedback;

fourth information, indicating the maximum quantity of retransmissions of the first sidelink CSI report; or fifth information, indicating the length of the first signaling that carries the first sidelink CSI report, that is, a length of the MAC CE that carries the first sidelink CSI report.

It should be noted that the assistance information in step 602 may be correspondingly determined by the first terminal based on the second information, the third information, the fourth information, the fifth information, and the sixth information.

Step 705: After receiving the access stratum configuration information that is sent by the second terminal 30 and that includes CSI-RS pattern information, the first terminal 20 triggers reporting of the first message.

It should be noted that, when the method shown in FIG. 7 is combined with the following example 2, the access stratum configuration information may further include the sixth information. The sixth information is used to indicate the period and the time offset value for sending the first sidelink CSI report by the first terminal 20 to the second terminal 30. The period and the time offset value may be the same as a period and a time offset value of a configuration grant used by the second terminal 30 to send data. Alternatively, the period and the time offset value are determined by the second terminal 30 based on implementation. This is not limited in this embodiment of this application. Based on this, the first terminal 20 may subsequently determine the period and the time offset value of the first sidelink CSI report in the assistance information set with reference to the sixth information.

It should be noted that, in this embodiment of this application, the first terminal 20 may not send the assistance information set to the base station. In other words, step 602 is an optional step. When the first terminal 20 sends the assistance information set to the base station, in one aspect, the assistance information set may be sent to the base station by using a separate message; in another aspect, the assistance information set may be carried in another message sent by the first terminal 20 to the base station, for example, the assistance information set may be carried in the first message. When the assistance information set is carried in the first message, step 602 may be omitted.

Step 603: The base station sends a second message to the first terminal 20, so that the first terminal 20 receives the second message from the base station.

The second message includes a first SR configuration identifier. The first SR configuration identifier is associated with the first SR configuration and the first SR resource. The first SR configuration and the first SR resource correspond to an SR used to request a sidelink resource, where the sidelink resource is used to transmit the sidelink CSI report.

In an optional implementation, the second message may include the first SR configuration and the first SR resource. Alternatively, when the second message does not include the first SR configuration and the first SR resource, one or more SR configurations or one or more SR resources are configured in the first terminal 20. In this case, the first terminal 20 may determine the first SR configuration and the first SR resource from the one or more SR configurations or the one or more SR resources based on the first SR configuration identifier. The one or more SR configurations or the one or more SR resources may be preconfigured for the first terminal 20, or configured by the base station for the first terminal 20. This is not limited in this embodiment of this application.

This may be understood as follows: One or more of the first SR configuration and the first SR resource are configured by the base station for the first terminal 20, and dedicated to sending a specific SR. The specific SR is used to request a sidelink resource used to transmit the sidelink CSI report. For example, the specific SR may correspond to the following first SR.

It should be noted that, when the first message does not carry an identifier of the second terminal, the first SR configuration and the first SR resource configured by the base station for the first terminal 20 can not only be used by the first terminal 20 to request, from the base station, a sidelink resource for sending a sidelink CSI report to the second terminal 30, but also be used by the first terminal 20 to request, from the base station, a sidelink resource for sending a sidelink CSI report to the second terminal 30. When the first message carries the identifier of the second terminal, the first SR configuration and the first SR resource configured by the base station for the first terminal 20 are used to request a sidelink resource for sending a sidelink CSI report to the second terminal 30. In other words, if the first message carries the identifier of the second terminal 30, the first SR configuration and the first SR resource in the second message are also associated with the identifier of the second terminal 30. In this case, the first SR sent by the first terminal 20 to the base station by using the first SR configuration and the first SR resource is used to request a sidelink resource for sending a sidelink CSI report to the second terminal 30.

It should be noted that, if the base station receives the assistance information set before the base station configures the first SR configuration and the first SR resource for the first terminal 20, the base station may consider specific content of the assistance information set when configuring the first SR configuration and the first SR resource for the first terminal 20. In other words, the base station configures the first SR configuration and the first SR resource for the first terminal 20 with reference to the specific content of the assistance information set. For example, the base station determines, based on the maximum allowed delay of the CSI in the assistance information set, a length of a disable timer and a maximum quantity of transmission times in the first SR configuration configured for the first terminal 20, and an SR resource period in the first SR resource.

In a possible embodiment, as shown in FIG. 6A and FIG. 6B, when the first sidelink CSI report is triggered, the method provided in this embodiment of this application may further include the following step:

Step 604: The first terminal 20 triggers the first scheduling request SR if a preset condition is met.

For example, the preset condition includes one or more of the following: The first terminal 20 has no sidelink resource for transmitting the first sidelink CSI report; or the first terminal triggers the sidelink buffer status report BSR, but has no uplink resource for transmitting the sidelink BSR; or if the first terminal has no sidelink resource for transmitting the first sidelink CSI report, the first terminal triggers the sidelink buffer status report BSR, but has no uplink resource for transmitting the sidelink BSR.

In other words, step 604 may be replaced by any one of steps 604a to 604c:

Step 604a: When the first terminal 20 has no sidelink resource for transmitting the first sidelink CSI report, the first terminal 20 triggers the first scheduling request SR.

Step 604b: When the first terminal 20 has no sidelink resource for transmitting the first sidelink CSI report, the first terminal 20 triggers the sidelink buffer status report (SL-BSR), and if the first terminal 20 has no uplink (uplink) resource for transmitting the SL-BSR, the first terminal 20 triggers the first scheduling request SR. In step 604b, when the first terminal 20 triggers the first sidelink CSI report, if the first terminal 20 determines that the first terminal 20 has no sidelink resource for transmitting the first sidelink CSI report, the first terminal 20 triggers the SL-BSR. After the SL-BSR is triggered, if the first terminal 20 has an uplink resource for transmitting the SL-BSR, the first terminal 20 may directly transmit the SL-BSR by using the uplink resource, that is, the first terminal 20 does not trigger the first SR.

Step 604c: The first terminal 20 triggers the sidelink buffer status report SL-BSR, and if the first terminal 20 has no uplink resource for transmitting the SL-BSR, the first terminal 20 triggers the first scheduling request SR. It may be understood that, in step 604c, when the first terminal 20 triggers the first sidelink CSI report, the first terminal 20 triggers the SL-BSR. After the SL-BSR is triggered, if the first terminal 20 has an uplink resource for transmitting the SL-BSR, the first terminal 20 may directly transmit the SL-BSR by using the uplink resource, that is, the first terminal 20 does not trigger the first SR.

In a specific implementation, that the first terminal 20 has no sidelink resource for transmitting the first sidelink CSI report may include one of the following three cases:

(1) The first terminal 20 does not have any sidelink resource.

(2) The first terminal 20 has a sidelink resource, but the sidelink resource cannot be used to transmit the sidelink CSI report.

(3) The first terminal 20 has a sidelink resource, but the sidelink resource cannot accommodate the first signaling that carries the sidelink CSI report and a packet header of the first signaling.

In a specific implementation, that the first terminal 20 has no uplink resource for transmitting the SL-BSR may include one of the following three cases:

(1) The first terminal 20 does not have any uplink resource. (2) The first terminal 20 has an uplink resource, but the uplink resource cannot meet a delay requirement of a sidelink CSI report. (3) The first terminal 20 has an uplink resource, but the uplink resource cannot accommodate a MAC CE that carries the SL-BSR and a corresponding MAC packet header.

In a possible embodiment, when the first terminal 20 has the first SR configuration and the first SR resource, the first terminal 20 may request the first sidelink resource from the base station by using steps 605 to 607.

As shown in FIG. 6A and FIG. 6B, steps 605 to 607 in FIG. 6A and FIG. 6B describe a process in which the first terminal 20 requests the first sidelink resource based on the first SR configuration and the first SR resource.

Step 605: The first terminal 20 sends the first SR to the base station on the first SR resource based on the first SR configuration, so that the base station receives the first SR.

Optionally, the first SR is used to request the base station to allocate, to the first terminal, a sidelink resource that can be used to transmit the sidelink CSI report.

It may be understood that, when the first terminal 20 sends the first SR to the base station based on any one of the first SR configuration and the first SR resource, the base station may determine to configure the first sidelink resource for the first terminal 20.

If the first SR configuration and the first SR resource are already used to request a sidelink resource for transmitting the sidelink CSI report, when the base station subsequently receives the first SR on the first SR resource, and/or the first SR uses the first SR configuration, the base station may determine that the first SR is used to request the base station to allocate, to the first terminal, a sidelink resource that can be used to transmit the sidelink CSI report. In other words, once the base station configures the first SR configuration and the first SR resource for the first terminal 20, when the base station subsequently receives the first SR on the first SR resource, regardless of whether the first SR has an indicative meaning, the base station may consider that the first SR is intended to request the base station to allocate, to the first terminal, a sidelink resource that can be used to transmit the sidelink CSI report.

It should be noted that steps 601 to 603 may be omitted in the following cases: The first terminal 20 is already configured with the first SR configuration and the first SR resource, or the first SR configuration and the first SR resource are predefined in a protocol, and the base station also knows meanings of the first SR configuration and the first SR resource; or the first terminal 20 has the first SR configuration and the first SR resource, and although the base station does not know meanings of the first SR configuration and the first SR resource, the first terminal 20 requests, by using the first SR, the base station to allocate, to the first terminal 20, a sidelink resource that can be used to transmit the sidelink CSI report. In other words, when the first terminal 20 is configured with the first SR configuration and the first SR resource, a process of requesting, by the first terminal 20, the base station to allocate the first SR configuration and the first SR resource may be omitted.

Step 606: The base station sends information about the first sidelink resource to the first terminal 20, so that the first terminal 20 receives the information about the first sidelink resource from the base station.

For example, the information about the first sidelink resource may be a time domain location or frequency domain location of the first sidelink resource, or an identifier of the first sidelink resource.

Correspondingly, as shown in FIG. 6A and FIG. 6B, step 401 in this embodiment of this application may be implemented in the following manner:

Step 607: When the first sidelink channel state information CSI report is triggered, the first terminal 20 determines the first sidelink resource based on the information about the first sidelink resource.

It should be noted that, in addition to the first SR triggered by the first sidelink CSI report, if the first terminal 20 further triggers an SR1 of a logical channel of another sidelink radio bearer, and an SR resource associated with the SR1 overlaps, in time, the first SR resource associated with the first SR, the first terminal 20 preferentially sends the SR1, or the first terminal 20 preferentially sends the first SR. Alternatively, the first terminal 20 compares a priority of the SR1 with a priority of the first SR, and preferentially sends an SR whose priority is higher. In this way, the first terminal 20 may also transmit the first sidelink CSI report on a sidelink resource obtained based on the SR1.

In a possible embodiment, as shown in FIG. 6A and FIG. 6B, when the first sidelink CSI report is triggered, the method provided in this embodiment of this application further includes the following steps.

Step 608: The first terminal 20 starts a first timer when the first sidelink CSI report is triggered.

Step 609: The first terminal 20 cancels the first sidelink CSI report if a first condition is met when the first timer times out.

The first condition includes one or more of the following: The first terminal 20 does not receive the first sidelink resource; or the first terminal 20 does not generate the first MAC PDU that includes the first sidelink CSI report; or the first terminal 20 does not send the first MAC PDU.

Optionally, if the first SR is triggered, when the first timer times out and the first condition is met, the first terminal 20 cancels the first SR.

It should be noted that, if step 604 is replaced by step 604b or 604c, optionally, if the SL-BSR is triggered, when the first timer times out and the first condition is met, the first terminal 20 cancels the SL-BSR triggered by the first sidelink CSI report.

In a possible embodiment, as shown in FIG. 6A and FIG. 6B, when the first timer is started, the method provided in this embodiment of this application further includes the following step:

Step 610: The first terminal 20 stops the first timer if a second condition is met during running of the first timer.

In an implementation, the second condition includes one or more of the following: The first terminal 20 receives the first sidelink resource; or the first terminal 20 generates the first MAC PDU; or the first terminal 20 already sends the first MAC PDU. In this embodiment of this application, a meaning of the MAC PDU that includes the first sidelink CSI report is equivalent to a meaning of the MAC PDU that includes the first signaling.

Optionally, if the first SR is triggered, when the second condition is met, the first terminal 20 cancels the first SR.

It should be noted that, if step 604 is replaced by step 604b or 604c, optionally, if the SL-BSR is triggered, when the first condition is met, the first terminal 20 cancels the SL-BSR triggered by the first sidelink CSI report.

If any SR sent by the first terminal 20 reaches a maximum quantity of transmission times, the first terminal 20 cancels sending of the SR. In addition, the first terminal 20 cancels the triggered first sidelink CSI report, stops the first timer, and triggers a random access process.

Optionally, if an SR that is sent by the first terminal 20 and that is used to request a sidelink resource for sending a sidelink CSI report reaches a maximum quantity of transmission times, the first terminal 20 cancels the triggered first sidelink CSI report and stops the first timer, but the first terminal 20 does not trigger a random access process.

In this embodiment of this application, a length of the first timer is defined in a protocol, or is determined by the first terminal 20, or is indicated by the second terminal 30 to the first terminal 20. For example, the length of the first timer is the maximum allowed delay of the first sidelink CSI report.

Step 611 is the same as step 402, and details are not described herein in this embodiment of this application again.

The first sidelink resource may be further used by the first terminal 20 to send sidelink data other than the first sidelink CSI report to the second terminal 30. However, limited by a size of the first sidelink resource, the first terminal 20 may determine a priority of the first signaling, and determine, based on the priority of the first signaling and a priority of the other sidelink data, whether to preferentially send the first signaling or the other sidelink data on the first sidelink resource.

Based on this, in a possible embodiment, as shown in FIG. 6A and FIG. 6B, before step 611, the method provided in this embodiment of this application may further include the following steps.

Step 612: In a process of sidelink logical channel priority processing, the first terminal 20 determines that the priority of the first signaling is a highest priority, or the priority of the first signaling is a first priority.

In this embodiment of this application, that the priority of the first signaling is the highest priority or the priority of the first signaling is the first priority may be autonomously determined by the first terminal 20, or the base station may configure the priority of the first signaling for the first terminal 20 by using dedicated signaling or system information. The first terminal 20 may compare the first priority of the first signaling with a priority of a sidelink logical channel, to determine whether to preferentially send the first signaling or send sidelink data on the sidelink logical channel by using the first sidelink resource.

When the priority of the first signaling is the highest priority, when performing logical channel priority processing on the first sidelink resource scheduled by the base station, the first terminal 20 preferentially selects the destination identifier of the peer terminal (that is, the second terminal 30) to which the first sidelink CSI report needs to be fed back. For example, if the first terminal 20 sends the first sidelink CSI report to the second terminal 30, and the first terminal further transmits sidelink data to a third terminal or the second terminal, when selecting a destination terminal in a process of logical channel priority processing, the first terminal 20 selects the second terminal, that is, communicates with the second terminal 30 by using the first sidelink resource scheduled by the base station. In addition, if a destination identifier of the sidelink data is the same as the destination identifier of the first signaling, the first terminal 20 may preferentially send the first signaling on the first sidelink resource. In this case, if the first sidelink resource is still not entirely occupied, the first terminal 20 may further send the sidelink data to the second terminal on the first sidelink resource.

When the priority of the first signaling is the highest priority, if the first terminal 20 needs to feed back the first sidelink CSI report to a plurality of peer terminals at the same time, the first terminal 20 further selects, from the plurality of peer terminals, a destination identifier of a peer terminal corresponding to a sidelink logical channel on which data is to be transmitted and whose sidelink logical channel priority is the highest. For example, the UE1 needs to feed back, to the UE2 and the UE3 at a same moment, MAC CEs that carry CSI, and the UE1 further needs to send sidelink data to the UE2 and the UE3 at the moment. If a priority of a sidelink logical channel of sidelink data that needs to be sent by the UE1 to the UE2 is 2, and a priority of a sidelink logical channel of sidelink data that needs to be sent by the UE1 to the UE3 is 3, when selecting a destination terminal in a process of logical channel priority processing, the UE1 selects the UE2 (the priority of the sidelink logical channel of the sidelink data for the UE2 is higher than the priority of the sidelink logical channel of the sidelink data for the UE3), that is, the UE1 communicates with the UE2 by using the first sidelink resource scheduled by the base station. Optionally, a priority of the MAC CE that carries the CSI, in the process of logical channel priority processing may also be used to determine a quantity of HARQ retransmissions of the first signaling or the first MAC PDU.

When the first terminal 20 sends the first signaling to the second terminal 30, a case that may occur is as follows: At the same time, the first terminal 20 needs to perform communication by using an LTE sidelink. For example, by using the LTE sidelink, the first terminal 20 sends sidelink data, sends a synchronization signal, or sends LTE sidelink system information. In this case, if the first terminal 20 cannot simultaneously send the first signaling on an NR sidelink and perform communication on the LTE sidelink, the first terminal 20 needs to give up transmission on one of the sidelinks. Therefore, the first terminal 20 may determine priorities of the first signaling to be sent on the NR sidelink and LTE information to be sent on the LTE sidelink. For example, the LTE information may include data, a synchronization signal, or system information. In this case, the first terminal 20 may obtain the priority of the first signaling by performing step 612 or step 613.

Step 613: The first terminal 20 sends the first MAC PDU when a moment at which the first terminal 20 sends the first MAC PDU conflicts with a moment at which the first terminal 20 performs communication on a first-standard sidelink. In other words, the first MAC PDU has a highest priority.

The first-standard sidelink may be the LTE sidelink. In this embodiment of this application, the first MAC PDU is sent on a second-standard sidelink. The second-standard sidelink may be the NR sidelink.

In this embodiment of this application, that the moment of the first MAC PDU conflicts with the moment at which the first terminal 20 performs communication on the first-standard sidelink means that the moment at which the first terminal 20 sends the first MAC PDU is the same as the moment at which the first terminal 20 performs communication on the first-standard sidelink, or a difference between the two moments is within a preset error.

Step 614: When a moment at which the first terminal 20 sends the first MAC PDU conflicts with a moment at which the first terminal performs communication on a first-standard sidelink, the first terminal 20 determines, based on a second priority of the first MAC PDU, whether to send the first MAC PDU. Communication on the first-standard sidelink is communication based on an LTE sidelink.

In a possible implementation, step 614 may be implemented in the following manner: When the second priority of the first MAC PDU is higher than a priority of the first-standard sidelink, the first terminal 20 transmits the first MAC PDU on a second-standard sidelink, and gives up LTE information that is to be sent on the LTE sidelink.

In another possible implementation, specifically, step 613 may be implemented in the following manner: the base station configures a priority of the first MAC PDU as the highest priority by using dedicated signaling or system information; or step 6134 may be implemented in the following manner: the base station preconfigures the second priority for the first MAC PDU by using dedicated signaling or system information, where the second priority is compared with the priority of the LTE sidelink.

For example, the priority of the first MAC PDU is 2. If the first terminal 20 needs to send LTE information on the LTE sidelink, and a priority of the LTE information is 1 (that is, the priority of the LTE sidelink is 2), when the foregoing case occurs, the first terminal 20 gives up transmission of the first MAC PDU on the NR sidelink, but sends the LTE information on the LTE sidelink (that is, the priority of the LTE sidelink is higher than the second priority of the first MAC PDU).

For example, if a priority of the LTE information is 3, and the priority of the first MAC PDU is 2, when the foregoing case occurs, the first terminal 20 transmits the first MAC PDU on the NR sidelink, and gives up sending the LTE information on the LTE sidelink (that is, the priority of the LTE sidelink is lower than the second priority of the first MAC PDU).

To sum up, step 614 in this embodiment of this application may be specifically implemented in the following manner: When the moment of the first MAC PDU conflicts with the moment at which the first terminal performs communication on the first-standard sidelink, the first terminal 20 sends the first MAC PDU if the second priority of the first MAC PDU is higher than the priority of the first-standard sidelink; or the first terminal 20 sends the LTE information on the LTE sidelink if the second priority of the first MAC PDU is lower than the priority of the first-standard sidelink.

Optionally, the second priority may be the same as the first priority, of the first MAC PDU, in the process of sidelink logical channel priority processing.

In a possible embodiment, before step 6n, the method provided in this embodiment of this application may further include the following step:

Step 615: The first terminal 20 sends second indication information to the second terminal 30, so that the second terminal 30 receives the second indication information from the first terminal 20. The second indication information is used to indicate the second terminal not to send HARQ information, or the second indication information indicates the second terminal to send HARQ information. The HARQ information is for the first MAC PDU.

In a possible embodiment, the second indication information in this embodiment of this application may be carried in the first MAC PDU.

In a possible embodiment, when the following third condition is met, the second indication information indicates the second terminal not to send the HARQ information that is for the first MAC PDU. The third condition includes one or more of the following: The first MAC PDU is configured not to support HARQ information feedback; or the first sidelink CSI report does not support HARQ information feedback; or the base station configures that the first MAC PDU does not support HARQ information feedback. When the following fourth condition is met, the second indication information indicates the second terminal 30 to send the HARQ information that is for the first MAC PDU. The fourth condition includes one or more of the following: The first MAC PDU is configured to support HARQ information feedback; or the first sidelink CSI report supports HARQ information feedback; or the base station configures that the first MAC PDU supports HARQ information feedback.

In a possible embodiment, the first MAC PDU further includes sidelink data carried on a first sidelink logical channel. The third condition further includes: Of the first sidelink logical channel and the first signaling included in the first MAC PDU, the one whose priority is higher does not support HARQ information feedback. The fourth condition further includes: Of the first sidelink logical channel and the first signaling included in the first MAC PDU, the one whose priority is higher supports HARQ information feedback.

For example, the first terminal 20 sends the first MAC PDU to the second terminal 30, and HARQ retransmission of the first MAC PDU includes the following two aspects:

(1) Whether HARQ feedback is required:

If the first MAC PDU includes only the first signaling, for whether HARQ feedback is required for transmission of the first MAC PDU, there are the following options:

Option 1: A standard predefines the following: Transmission of the first MAC PDU does not support HARQ feedback if the first MAC PDU includes only the first signaling.

Option 2: If the first MAC PDU includes only the first signaling, whether transmission of the first MAC PDU supports HARQ feedback depends on the third information notified by the second terminal 30 to the first terminal 20, where the third information is an indication of whether transmission of information that carries the first sidelink CSI report supports HARQ feedback.

Option 3: If the first MAC PDU includes only the first signaling, whether transmission of the first MAC PDU supports HARQ feedback is configured by the base station for the first terminal 20 by using dedicated signaling or system information, and is notified by the first terminal 20 to the second terminal 30.

If the first MAC PDU includes not only the first signaling but also sidelink data, whether transmission of the first MAC PDU supports HARQ feedback depends on a HARQ feedback configuration of the one whose priority is the higher of the first signaling included in the first MAC PDU and a logical channel corresponding to the sidelink data. If a priority of the logical channel corresponding to the sidelink data is higher, and the logical channel supports HARQ feedback, the first MAC PDU supports HARQ feedback. If a priority of the logical channel corresponding to the sidelink data is higher, and the logical channel does not support HARQ feedback, the first MAC PDU does not support HARQ feedback. If a priority of the first signaling is higher, and the first signaling supports HARQ feedback, the first MAC PDU supports HARQ feedback. If a priority of the first signaling is higher, and the first signaling does not support HARQ feedback, the first MAC PDU does not support HARQ feedback.

In a possible embodiment, as shown in FIG. 6A and FIG. 6B, the method provided in this embodiment of this application further includes the following step:

Step 616: The first terminal 20 determines a maximum quantity of retransmissions of the first MAC PDU. The maximum quantity of retransmissions of the first MAC PDU is predefined in a protocol, or is determined based on the maximum quantity of retransmissions that corresponds to the first sidelink CSI report, or the maximum quantity of retransmissions of the first MAC PDU is configured by the base station.

In a possible implementation, in addition to the first signaling, the first MAC PDU further includes sidelink data carried on the first sidelink logical channel, and the maximum quantity of retransmissions of the first MAC PDU is determined based on a quantity of retransmissions that corresponds to the one whose priority is the higher of the first sidelink logical channel and the first signaling included in the first MAC PDU.

For example, if the first MAC PDU includes only the first signaling, for determining the maximum quantity of HARQ retransmissions of the first MAC PDU, there may be the following options:

Option 1: If the first MAC PDU includes only the first signaling, the maximum quantity of HARQ retransmissions of the first MAC PDU is predefined by a protocol.

Option 2: If the first MAC PDU includes only the first signaling, the maximum quantity of HARQ retransmissions of the first MAC PDU depends on a value of the fourth information sent by the second terminal 30 to the first terminal 20, where the fourth information indicates a maximum quantity of retransmissions of the first signaling.

Option 3: If the first MAC PDU includes only the first signaling, the maximum quantity of HARQ retransmissions of the first MAC PDU is configured by the base station that serves the first terminal 20, by using dedicated signaling or system information.

If the first MAC PDU includes not only the first signaling but also sidelink data, the maximum quantity of HARQ retransmissions of the first MAC PDU depends on a maximum quantity of HARQ retransmissions of a logical channel that is included in the first MAC PDU and that has a highest logical channel priority.

In a possible embodiment, as shown in FIG. 6A and FIG. 6B, after step 611, the method provided in this embodiment of this application may further include the following step:

Step 617: When the first terminal 20 determines that the sidelink CSI report no longer needs to be sent, the first terminal 20 may send a fourth message to the base station, so that the base station receives the fourth message. The fourth message may be a SidelinkUEInformation message, a UEAssistanceInformation message, or a newly defined RRC message.

In a specific implementation, the fourth message includes third indication information. The third indication information may have the following two optional meanings:

(1) First meaning: The third indication information is used to indicate that the first terminal 20 no longer needs the first SR configuration and the first SR resource that are associated with the first SR configuration identifier configured by the base station in the second message.

(2) Second meaning: The third indication information is used to indicate that the first terminal 20 no longer needs to send the sidelink CSI report.

If the first message includes the identifier of the second terminal, the fourth message may also include the identifier of the second terminal.

A condition for determining, by the first terminal 20, that the sidelink CSI report no longer needs to be sent may include, for example, the following: The second terminal 30 notifies the first terminal 20 that the CSI of the sidelink between the first terminal 20 and the second terminal 30 no longer needs to be fed back, or the unicast communication connection between the first terminal 30 and the first terminal 20 is released.

Optionally, a manner in which the second terminal 30 notifies the first terminal 20 that the CSI of the sidelink between the first terminal 20 and the second terminal 30 no longer needs to be fed back may be as follows: The second terminal releases the CSI-RS pattern (pattern) that is previously configured for the first terminal.

Example 2: The base station configures a configuration grant (Configuration Grant) for the first terminal 20.

Figure 8:
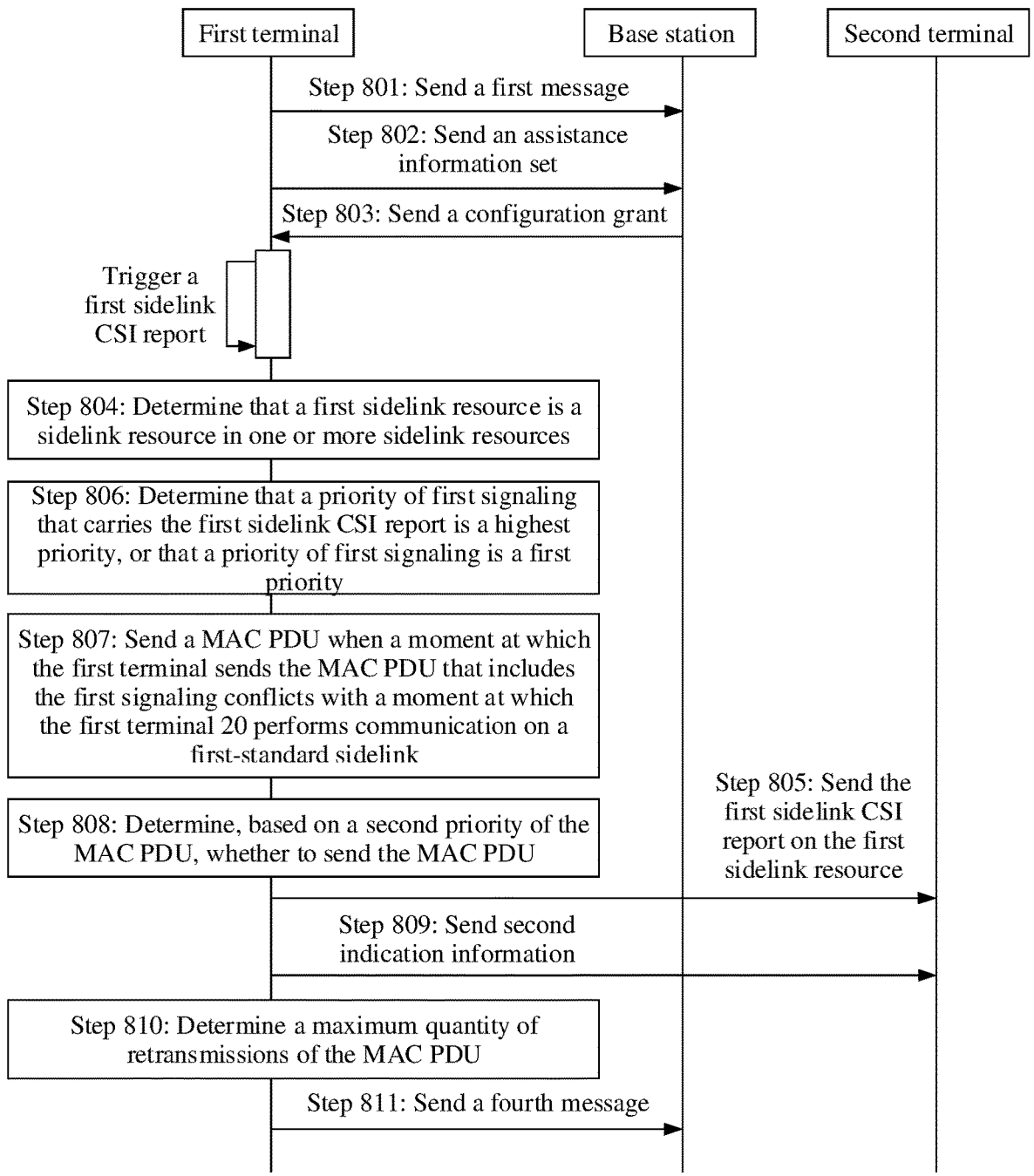

In a possible embodiment, as shown in FIG. 8, before the first sidelink channel state information CSI report is triggered, the method provided in this embodiment of this application may further include the following steps.

Step 801 and step 802 are the same as descriptions of step 601 and step 602.

A difference lies in that, in the embodiment shown in FIG. 8, the first indication information has the foregoing second meaning. In addition, the assistance information may further include the period and the time offset value for sending the first sidelink CSI report by the first terminal 20. The period and the time offset value may be autonomously determined by the first terminal 20, or may be indicated by the second terminal 30 to the first terminal 20. This is not limited in this embodiment of this application.

Step 803: The base station sends the configuration grant to the first terminal 20, so that the first terminal 20 receives the configuration grant from the base station. The configuration grant is used by the first terminal 20 to determine a sidelink resource that is configured by the base station for the first terminal 20 and that can be used to transmit the sidelink CSI report.

In an implementation, the configuration grant may be carried in a third message. The third message may be an RRC message.

It should be noted that step 801 to step 803 describe a process in which the base station configures the configuration grant for the first terminal 20 when triggered by the first terminal 20. When the base station can autonomously determine to configure the configuration grant for the first terminal 20, step 801 and step 802 may be omitted.

For different content of the configuration grant, the first terminal 20 determines the first sidelink resource based on the configuration grant in different manners. The following describes each case.

Example 2-1: The configuration grant is used to indicate information about one or more sidelink resources configured for the first terminal 20. Such a configuration grant may be referred to as a first-type configuration grant. The one or more sidelink resources can be used to transmit the sidelink CSI report.

In a specific implementation, the configuration grant in the example 2-1 in this embodiment of this application may include one or more first-type configuration grants. Each of the one or more first-type configuration grants indicates information about a sidelink resource configured for the first terminal 20.

It should be understood that, in the example 2-1, when the first sidelink CSI report is triggered, the first terminal 20 sends the first message to the base station to indicate that the first terminal is to send a sidelink CSI report (or is to send the first sidelink CSI report). In this case, the base station indicates, by using the configuration grant, the one or more sidelink resources configured by the base station for the first terminal 20. Subsequently, after generating the first sidelink CSI report, the first terminal 20 may select one sidelink resource from the one or more sidelink resources as the first sidelink resource. In other words, the first sidelink resource is a sidelink resource in the one or more sidelink resources. That is, step 401 may be implemented by using step 804: When the first sidelink channel state information CSI report is triggered, the first terminal 20 determines that the first sidelink resource is a sidelink resource in the one or more sidelink resources.

In a specific implementation, a moment of the first sidelink resource is after a moment at which the first sidelink CSI report is triggered.

In a specific implementation, a time interval between the moment of the first sidelink resource and the trigger moment meets the maximum allowed delay of the first sidelink CSI report.

In a specific implementation, if a time interval between a moment of any one of the one or more sidelink resources and the trigger moment is greater than the maximum allowed delay of the first sidelink CSI report, or a time interval between a moment of a target sidelink resource in the one or more sidelink resources and a moment at which the first terminal 20 sends the first sidelink CSI report is greater than the maximum allowed delay of the first sidelink CSI report, the first terminal 20 cancels the first sidelink CSI report. The target sidelink resource is located after the moment at which the first sidelink CSI report is triggered, and the time interval between the moment of the target sidelink resource and the moment at which the first terminal 20 sends the first sidelink CSI report is less than a time interval between a moment of another sidelink resource in the one or more sidelink resources and the moment at which the first sidelink CSI report is sent. In other words, although the base station configures, for the first terminal 20, the one or more sidelink resources that can be used to transmit the sidelink CSI report, sending the first sidelink CSI report by using the sidelink resource may cause a delay of the first sidelink CSI report to exceed the maximum allowed delay. Therefore, the first terminal 20 may give up sending the first sidelink CSI report.

Optionally, if the first message does not carry the identifier of the second terminal, the first-type configuration grant is used to determine a sidelink resource for sending a sidelink CSI report by the first terminal 20. If the first message carries the identifier of the second terminal, the first-type configuration grant is used by the first terminal 20 to determine a sidelink resource for sending a sidelink CSI report by the first terminal 20 to the second terminal 30.

It may be understood that, when step 801 and step 802 are omitted, a protocol may define that the base station configures the first-type configuration grant for the first terminal 20.

Step 805 in FIG. 8 is the same as step 402, and details are not described herein again.

In a possible embodiment, the embodiment shown in FIG. 8 may further include step 806 to step 811. For specific content of step 806 to step 811, reference may be correspondingly made to descriptions in step 612 to step 617. Details are not described herein again.

It should be noted that, in the embodiment shown in FIG. 8, the second indication information may have the following two optional meanings:

(1) First meaning: The second indication information is used to indicate that the first terminal 20 no longer needs the first-type configuration grant configured by the base station in the second message.

(2) Second meaning: The second indication information is used to indicate that the first terminal 20 no longer sends a sidelink CSI report.

Example 2-2: The configuration grant is used to indicate a period of a second sidelink resource configured for the first terminal 20. Such a configuration grant may be referred to as a second-type configuration grant. In addition, the configuration grant is further used to indicate a time offset of the second sidelink resource configured for the first terminal 20.

It should be noted that, in this application, a difference between the first-type configuration grant and the second-type configuration grant lies in the following: The base station indicates, to the first terminal 20 by using the first-type configuration grant, one or more second sidelink resources that are already configured for the first terminal 20. The base station indicates, to the first terminal 20 by using the second-type configuration grant, that there is a sidelink resource that can be used to transmit the sidelink CSI report, but at this moment, the base station does not inform the first terminal 20 of a time-frequency location of the sidelink resource that can be used to transmit the sidelink CSI report. Subsequently, the first terminal 20 may activate the second-type configuration grant to determine the time-frequency location of the sidelink resource that can be used to transmit the sidelink CSI report and that corresponds to the second-type configuration grant. Alternatively, the second-type configuration grant indicates, to the first terminal 20, that there is a sidelink resource that can be used to transmit the sidelink CSI report. Subsequently, in a process in which the first terminal 20 activates the second-type configuration grant, the base station not only indicates a time-frequency location of the sidelink resource that can be used to transmit the sidelink CSI report, but also indicates, to the first terminal 20, a period of the sidelink resource that can be used to transmit the sidelink CSI report. In other words, after the first terminal 20 activates the second-type configuration grant, the sidelink resource indicated by the second-type configuration grant is a periodic resource.

Figure 9A:
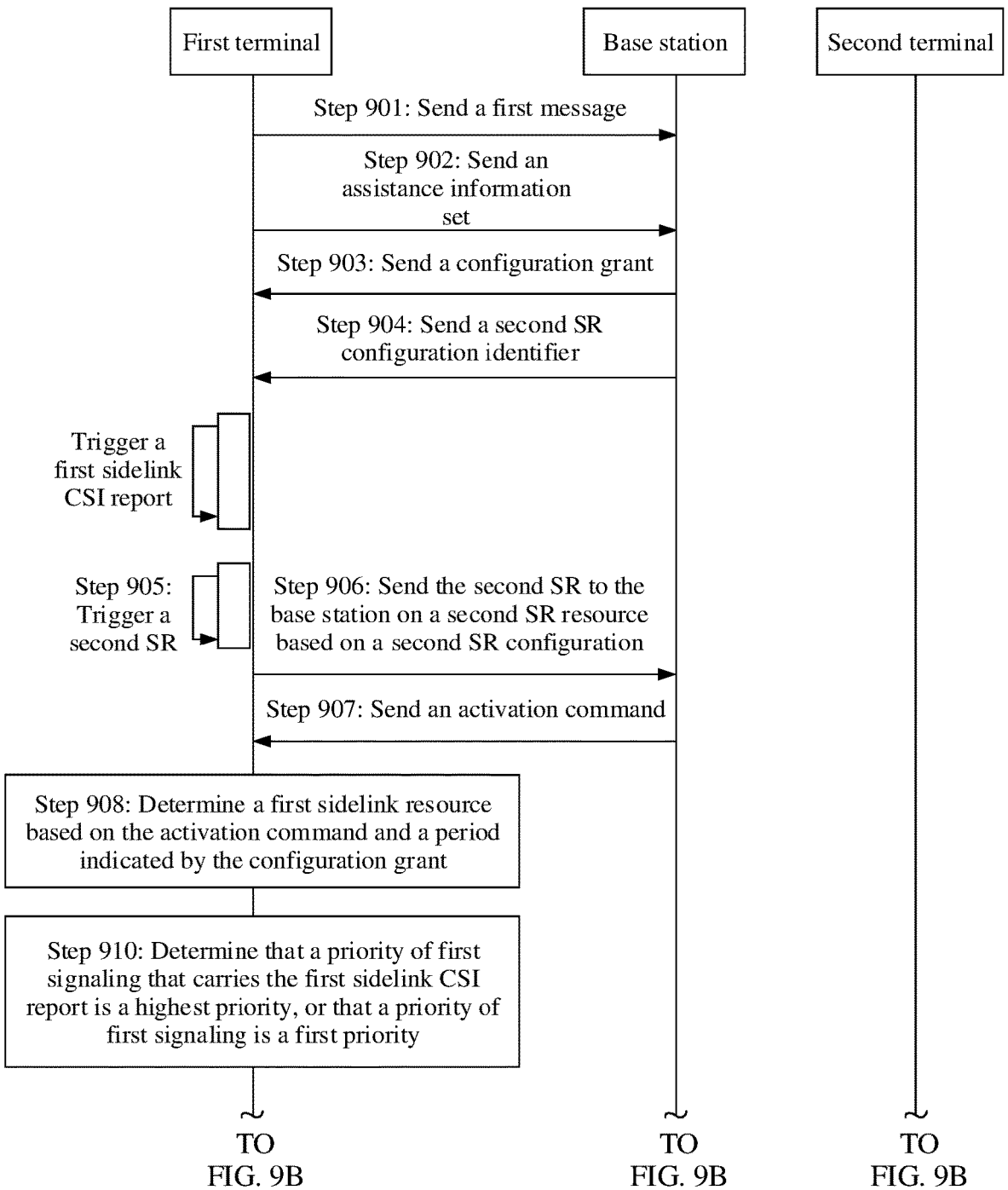
Figure 9B:
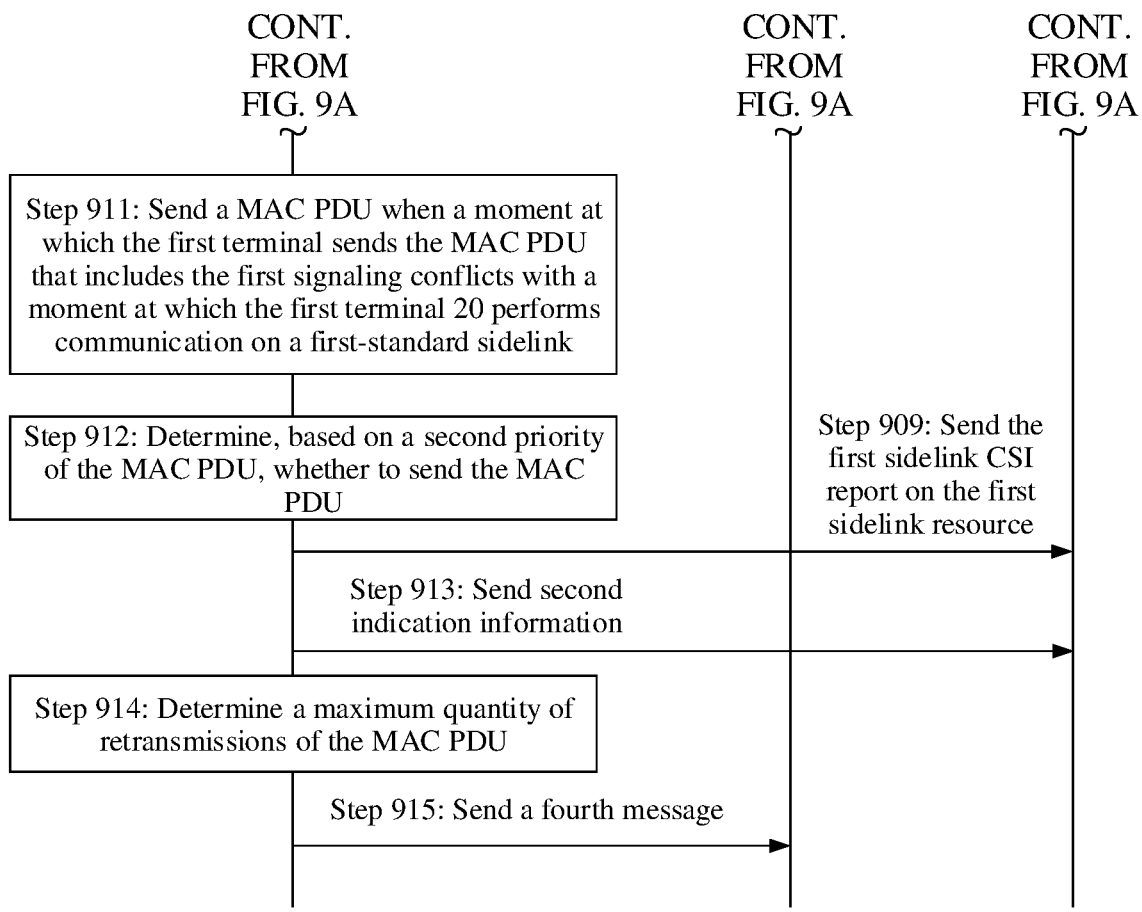

In a possible embodiment, as shown in FIG. 9A and FIG. 9B, before the first sidelink channel state information CSI report is triggered, the method provided in this embodiment of this application may further include the following steps before step 401.

Step 901 and step 902 are the same as step 601 and step 602, and details are not described herein again.

Step 903: The base station sends the configuration grant to the first terminal 20, so that the first terminal 20 receives the configuration grant from the base station.

The configuration grant may be carried in a third message.

Step 904: The base station sends a second SR configuration identifier to the first terminal 20, so that the first terminal 20 receives the second SR configuration identifier.

The second SR configuration identifier is associated with a second SR configuration and a second SR resource. The second SR configuration and the second SR resource correspond to an SR used to request to activate the configuration grant.

Optionally, the second SR configuration identifier may be carried in the third message. When the second SR configuration identifier is carried in the third message, step 904 may be omitted. The second SR configuration and the second SR resource may be included in the second message, or may be in an SR configuration set that is previously configured by the base station for the first terminal 20. The SR configuration set includes an SR resource and an SR configuration. The first terminal 20 may select the second SR configuration and the second SR resource from the SR configuration set based on the second SR configuration identifier.

In a possible embodiment, as shown in FIG. 9A and FIG. 9B, when the first sidelink channel state information CSI report is triggered, the method provided in this embodiment of this application may further include the following steps.

Step 905: The first terminal 20 triggers a second SR when the configuration grant is not activated; or the first terminal 20 triggers a second SR when the configuration grant is not activated and the first terminal 20 has no available sidelink resource.

In a specific implementation, that there is no sidelink resource for transmitting the first sidelink CSI report may include one of the following three cases:

(1) The first terminal 20 does not have any sidelink resource. (2) The first terminal 20 has a sidelink resource, but the sidelink resource cannot be used to transmit the sidelink CSI report. (3) The first terminal 20 has a sidelink resource, but the sidelink resource cannot accommodate the first signaling that carries the sidelink CSI report and a packet header of the first signaling.

Step 906: The first terminal 20 sends the second SR to the base station on the second SR resource based on the second SR configuration, so that the base station receives the second SR from the first terminal 20.

It may be understood that, if the base station determines that the second SR comes from the second SR resource and/or uses the second SR configuration, the base station determines that the first terminal 20 uses the second SR to request to activate the configuration grant.

Step 907: The base station sends an activation command to the first terminal 20, so that the first terminal 20 receives the activation command. The activation command carries information about a sidelink resource corresponding to the configuration grant.

For example, the activation command indicates, to the first terminal 20, time domain and frequency domain resource locations of the sidelink resource corresponding to the configuration grant.

Correspondingly, in this embodiment of this application, step 401 may be specifically implemented by using step 908:

Step 908: When the first sidelink CSI report is triggered, the first terminal 20 determines the first sidelink resource based on the activation command and the period indicated by the configuration grant.

In a specific implementation of step 908, the first terminal 20 may determine, as the first sidelink resource, a next sidelink resource after the first sidelink resource activated by the activation command.

Specific implementation of step 909 is the same as that of step 402, and details are not described herein again.

It should be noted that, in the example 2-2, if the second-type configuration grant is already activated, the first terminal may skip a process of sending the second SR. In addition, the first terminal 20 may directly determine the first sidelink resource based on the activated second-type configuration grant. For a specific process, refer to a process in which the first terminal 20 determines the first sidelink resource based on the first-type configuration grant in the example 2-1. Details are not described herein again.

Figure 10:
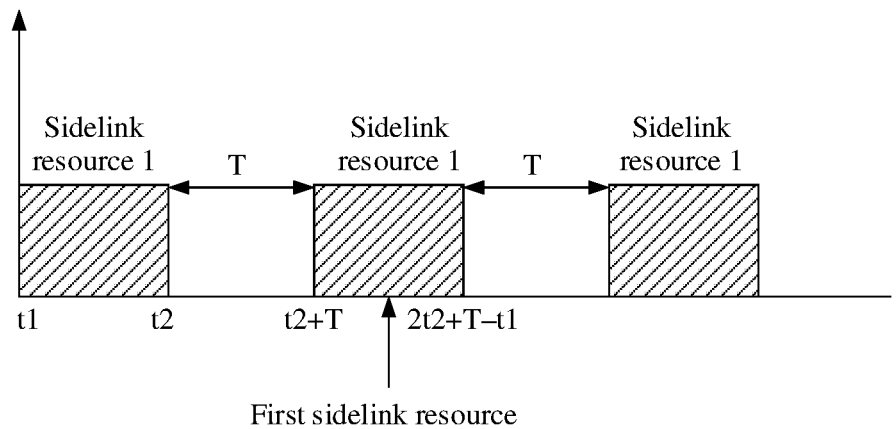
FIG. 10 is a schematic diagram of a periodic sidelink resource according to an embodiment of this application.

FIG. 10 shows sidelink resources 1 indicated by the base station to the first terminal 20 by using the activation command after the first terminal 20 sends the second SR. An interval between two adjacent sidelink resources 1 is T. If the first activated sidelink resource is a sidelink resource 1 between t1 and t2, the first terminal 20 may determine that a sidelink resource 1 starting from t2+T is the first sidelink resource.

It should be noted that, if the first message does not carry the identifier of the second terminal, the second-type configuration grant in the example 2-2 is used to determine a sidelink resource for sending a sidelink CSI report by the first terminal 20. If the first message carries the identifier of the second terminal, the second-type configuration grant is used to determine a sidelink CSI report sent by the first terminal 20 to the second terminal 30.

It should be noted that, in addition to the second SR, if the first terminal 20 further triggers an SR2 of a logical channel of another sidelink radio bearer, and an SR resource associated with the SR2 overlaps, in time, the second SR resource associated with the second SR, the first terminal 20 preferentially sends the SR1, or the first terminal 20 preferentially sends the second SR. Alternatively, the first terminal 20 compares a priority of the SR1 with a priority of the second SR, and preferentially sends an SR whose priority is higher.

In a possible embodiment, the embodiment shown in FIG. 9A and FIG. 9B may further include step 910 to step 915. For specific content of step 910 to step 915, reference may be correspondingly made to descriptions in step 612 to step 617. Details are not described herein again.

It should be noted that, in the embodiment shown in FIG. 9A and FIG. 9B, the second indication information may have the following two optional meanings:

(1) First meaning: The second indication information is used to indicate that the first terminal 20 no longer needs the second-type configuration grant configured for the first terminal 20 and the second SR configuration and the second resource that are associated with the second SR configuration identifier.

(2) Second meaning: The second indication information is used to indicate that the first terminal 20 no longer needs to send the sidelink CSI report.

In a possible embodiment, in the embodiment shown in FIG. 9A and FIG. 9B, the method provided in this embodiment of this application further includes step 608 and step 609, and/or step 610.

The foregoing describes the solutions in the embodiments of this application mainly from a perspective of interaction between network elements. It may be understood that, to implement the foregoing functions, the network elements such as the first terminal 20 and the base station each include a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods for each particular application to implement the described functions, but it should not be considered that the implementation goes beyond the scope of this application.

In the embodiments of this application, the first terminal 20 and the base station may be divided into functional units based on the foregoing method examples. For example, the functional units may be obtained through division in one-to-one correspondence with functions, or two or more functions may be integrated into one processing unit. The integrated unit may be implemented in a form of hardware, or may be implemented in a form of a software function unit. It should be noted that, in the embodiments of this application, division into the units is an example, and is merely a logical function division. In actual implementation, another division manner may be used.

The foregoing describes the method in the embodiments of this application with reference to FIG. 4 to FIG. 10. The following describes communications apparatuses, for performing the foregoing method, provided in the embodiments of this application. A person skilled in the art may understand that method embodiments and apparatus embodiments may be combined and cross-referenced. The communications apparatuses provided in the embodiments of this application may perform the steps performed by the first terminal 20 and the base station in the foregoing communication method.

Figure 11:
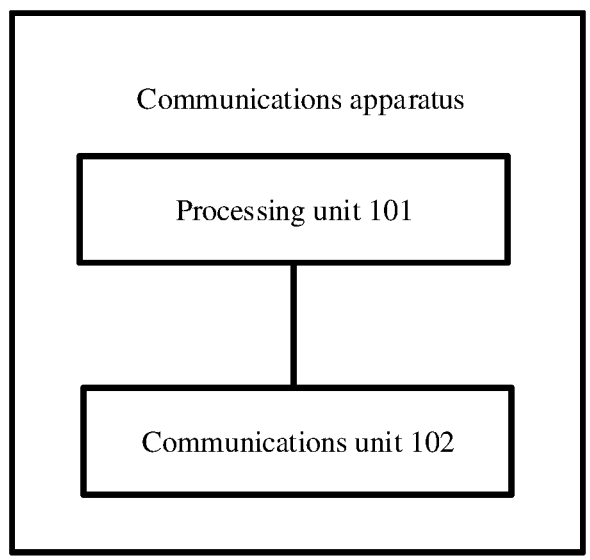
FIG. 11 is a schematic structural diagram of a communications apparatus according to an embodiment of this application.

When an integrated unit is used, FIG. 11 shows a communications apparatus related to the foregoing embodiments. The communications apparatus may include a communications unit 102 and a processing unit 101.

For example, the communications apparatus is a first terminal, or a chip applied to a first terminal. In this case, the processing unit 101 is configured to support the communications apparatus in performing the step performed by the first terminal in step 401 in the foregoing embodiment, and the communications unit 102 is configured to support the communications apparatus in performing step 402 performed by the first terminal in the foregoing embodiment.

In a possible embodiment, the processing unit 101 is further configured to support the communications apparatus in performing step 502, step 701, step 705, step 604, step 604a, step 604b, step 604c, step 607, step 608, step 609, step 610, step 612, step 613, step 614, step 616, step 905, and step 908 in the foregoing embodiments.

The communications unit 102 is configured to support the communications apparatus in performing actions of receiving by the first terminal in step 501, step 702, step 704, step 603, step 606, step 803, step 903, step 904, and step 907, and actions of sending by the first terminal in step 601, step 602, step 703, step 605, step 615, step 617, and step 906 in the foregoing embodiments.

For another example, the communications apparatus is a base station, or a chip applied to a base station. In this case, the communications unit 101 is configured to support the communications apparatus in performing an action performed by the base station in step 401 in the foregoing embodiment, and the processing unit 102 is configured to support the communications apparatus in performing an action other than information receiving and sending.

In a possible embodiment, the communications unit 102 is further configured to support the communications apparatus in performing actions of receiving by the base station in step 601, step 602, step 605, step 606, step 617, and step 906, and actions of sending by the base station in step 603, step 803, step 903, step 904, and step 907 in the foregoing embodiments.

Figure 12:
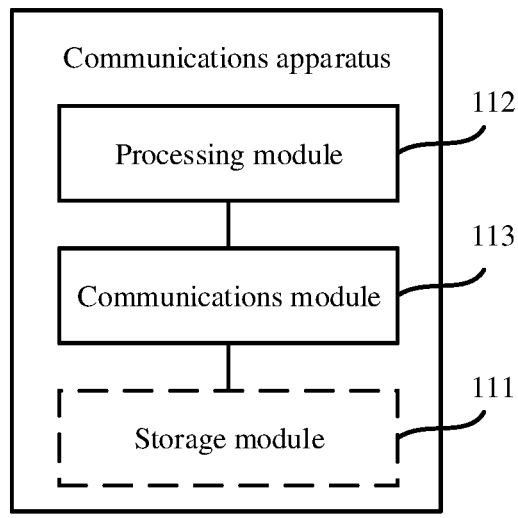
FIG. 12 is a schematic structural diagram of another communications apparatus according to an embodiment of this application.

When an integrated unit is used, FIG. 12 is a schematic diagram of a possible logical structure of a communications apparatus related to the foregoing embodiments. The communications apparatus includes a processing module 112 and a communications module 113. The processing module 112 is configured to control and manage an action of the communications apparatus. For example, the processing module 112 is configured to perform a step of information/data processing in the communications apparatus. The communications module 113 is configured to support the communications apparatus in performing a step of information/data sending or receiving.

In a possible embodiment, the communications apparatus may further include a storage module 11, configured to store program code and data for the communications apparatus.

For example, the communications apparatus is a first terminal, or a chip applied to a first terminal. In this case, the processing module 112 is configured to support the communications apparatus in performing the step performed by the first terminal in step 401 in the foregoing embodiment, and the communications module 113 is configured to support the communications apparatus in performing step 402 performed by the first terminal in the foregoing embodiment.

In a possible embodiment, the processing module 112 is further configured to support the communications apparatus in performing step 502, step 701, step 705, step 604, step 604*a*, step 604*b*, step 604*c*, step 607, step 608, step 609, step 610, step 612, step 613, step 614, step 616, step 905, and step 908 in the foregoing embodiments.

The communications module 113 is configured to support the communications apparatus in performing actions of receiving by the first terminal in step 501, step 702, step 704, step 603, step 606, step 803, step 903, step 904, and step 907, and actions of sending by the first terminal in step 601, step 602, step 703, step 605, step 615, step 617, and step 906 in the foregoing embodiments.

For another example, the communications apparatus is a base station, or a chip applied to a base station. In this case, the communications unit 101 is configured to support the communications apparatus in performing an action performed by the base station in step 401 in the foregoing embodiment, and the processing unit 102 is configured to support the communications apparatus in performing an action other than information receiving and sending.

In a possible embodiment, the communications module 113 is further configured to support the communications apparatus in performing actions of receiving by the base station in step 601, step 602, step 605, step 606, step 617, and step 906, and actions of sending by the base station in step 603, step 803, step 903, step 904, and step 907 in the foregoing embodiments.

The processing module 112 may be a processor or controller, for example, the processing module may be a central processing unit, a general purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The communications module 113 may be a transceiver, a transceiver circuit, a communications interface, or the like. The storage module 111 may be a memory.

When the processing module 112 is a processor 31 or a processor 35, the communications module 113 is a communications interface 33, and the storage module 111 is a memory 32, the communications apparatus in this application may be the communications device shown in FIG. 3.

Figure 13:
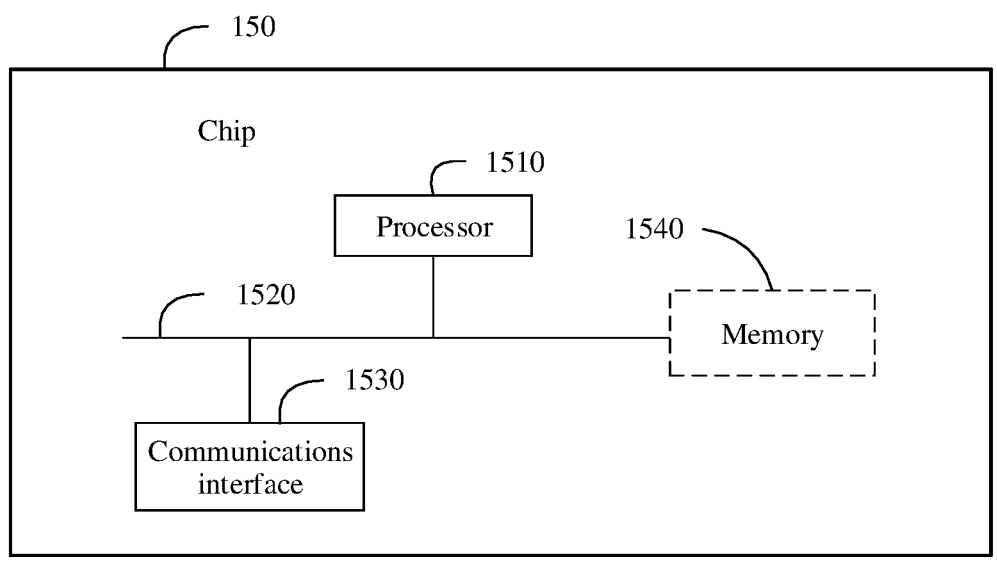
FIG. 13 is a schematic structural diagram of a chip according to an embodiment of this application.

FIG. 13 is a schematic structural diagram of a chip 150 according to an embodiment of this application. The chip 150 includes one or more (including two) processors 1510 and a communications interface 1530.

Optionally, the chip 150 further includes a memory 1540. The memory 1540 includes a read-only memory and a random access memory, and provides an instruction and data to the processor. A part of the memory 1540 may further include a non-volatile random access memory (non-volatile random access memory, NVRAM).

In some implementations, the memory 1540 stores the following elements, an executable module or a data structure, or a subset thereof, or an extended set thereof.

In this embodiment of this application, a corresponding operation is performed by invoking an operation instruction (the operation instruction may be stored in an operating system) stored in the memory 1540.

In a possible implementation, a structure of a chip used by a first terminal is similar to that of a chip used by a base station, and different apparatuses may use different chips to implement respective functions.

The processor 1510 controls a processing operation of either of the first terminal and the base station. The processor 1510 may also be referred to as a central processing unit (central processing unit, CPU).

The memory 1540 may include a read-only memory and a random access memory, and provide an instruction and data to the processor 1510. A part of the memory 1540 may further include an NVRAM. For example, in an application, the memory 1540, the communications interface 1530, and the memory 1540 are coupled together by using a bus system 1520. In addition to a data bus, the bus system 1520 includes a power bus, a control bus, and a status signal bus. However, for clear description, in FIG. 13, various types of buses are marked as the bus system 1520.

The method disclosed in the foregoing embodiments of this application may be applied to the processor 1510, or implemented by the processor 1510. The processor 1510 may be an integrated circuit chip and has a signal processing capability. In an implementation process, steps in the foregoing methods can be implemented by using a hardware integrated logical circuit in the processor 1510, or by using instructions in a form of software. The foregoing processor 1510 may be a general purpose processor, a digital signal processor (digital signal processor DSP), an ASIC, a field-programmable gate array (field-programmable gate array, FPGA) or another programmable logic device, a discrete gate or transistor logic device, or a discrete hardware component. The processor may implement or perform the methods, steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540, and completes the steps in the foregoing methods in combination with hardware of the processor.

In a possible implementation, the communications interface 1530 is configured to perform steps of receiving and sending by the first terminal and the base station in the embodiments shown in FIG. 4 to FIG. 9A and FIG. 9B. The processor 1510 is configured to perform steps of processing by the first terminal and the base station in the embodiments shown in FIG. 4 to FIG. 9A and FIG. 9B.

The foregoing communications unit may be a communications interface of the apparatus, and is configured to receive a signal from another apparatus. For example, when the apparatus is implemented by a chip, the communications unit is a communications interface used by the chip to receive a signal from or send a signal to another chip or apparatus.

According to an aspect, a computer readable storage medium is provided. The computer readable storage medium stores instructions. When the instructions are run, functions of the first terminal in FIG. 4 to FIG. 9A and FIG. 9B are implemented.

According to another aspect, a computer readable storage medium is provided. The computer readable storage medium stores instructions. When the instructions are run, functions of the base station in FIG. 4 to FIG. 9A and FIG. 9B are implemented.

According to still another aspect, a computer program product including instructions is provided. The computer program product includes the instructions. When the instructions are run, functions of the first terminal in FIG. 4 to FIG. 9A and FIG. 9B are implemented.

According to still another aspect, a computer program product including instructions is provided. The computer program product includes the instructions. When the instructions are run, functions of the base station in FIG. 4 to FIG. 9A and FIG. 9B are implemented.

According to an aspect, a chip is provided. The chip is applied to a first terminal. The chip includes at least one processor and a communications interface. The communications interface is coupled to the at least one processor. The processor is configured to run instructions, to implement functions of the first terminal in FIG. 4 to FIG. 9A and FIG. 9B.

According to another aspect, a chip is provided. The chip is applied to a first network management unit. The chip includes at least one processor and a communications interface. The communications interface is coupled to the at least one processor. The processor is configured to run instructions, to implement functions of the base station in FIG. 4 to FIG. 9A and FIG. 9B.

An embodiment of this application provides a communications system. The communications system includes a first terminal and a base station. The first terminal is configured to perform any step performed by the first terminal in FIG. 4 to FIG. 9A and FIG. 9B, and the base station is configured to perform any step performed by the base station in FIG. 4 to FIG. 9A and FIG. 9B.

In a possible implementation, the communications system may further include a second terminal. The second terminal is configured to perform the steps performed by the second terminal in FIG. 4 to FIG. 9A and FIG. 9B.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer programs or instructions. When the computer programs or instructions are loaded and executed on a computer, the procedures or functions according to the embodiments of this application are all or partially generated. The computer may be a general-purpose computer, a dedicated computer, a computer network, a network device, a user device, or another programmable apparatus. The computer programs or instructions may be stored in a computer readable storage medium, or may be transmitted from a computer readable storage medium to another computer readable storage medium. For example, the computer programs or instructions may be transmitted from a website, computer, server, or data center to another website, computer, server, or data center in a wired or wireless manner. The computer readable storage medium may be any usable medium accessible to a computer, or a data storage device, such as a server or a data center, integrating one or more usable media. The usable medium may be a magnetic medium, for example, a floppy disk, a hard disk, or a magnetic tape, may be an optical medium, for example, a digital video disc (digital video disc, DVD), or may be a semiconductor medium, for example, a solid-state drive (solid-state drive, SSD).

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example descriptions of this application defined by the appended claims, and are considered as covering any or all of modifications, variations, combinations, or equivalents within the scope of this application. Obviously, a person skilled in the art can make various modifications and variations to this application without departing from the spirit and scope of this application. This application is intended to cover these modifications and variations of this application, provided that they fall within the scope of protection defined by the following claims and equivalent technologies thereof.

What is claimed is:

1. A method, performed by a first terminal or a chip applied to the first terminal, the method comprising:
receiving access stratum configuration information of a sidelink carried by a radio resource control (RRC) message from a second terminal, wherein the access stratum configuration information indicates a maximum allowed delay of first sidelink channel state information (CSI) reporting;
triggering the first sidelink CSI reporting;
in response to the first sidelink CSI reporting being triggered, starting a first timer, wherein a length of the first timer is the maximum allowed delay of the first sidelink CSI reporting; and
canceling the first sidelink CSI reporting when the first timer times out, wherein the first sidelink CSI reporting is used by the first terminal to feed back, to the second terminal, CSI of the sidelink between the first terminal and the second terminal.

2. The method according to claim 1, further comprising:
in response to the first-sidelink CSI reporting being triggered, triggering, a first scheduling request (SR) when a preset condition is met; and
sending the first SR on a first SR resource based on a first SR configuration, wherein the first SR configuration and the first SR resource correspond to an SR that requests a first sidelink resource for transmitting the first sidelink CSI reporting.

3. The method according to claim 2, wherein the preset condition comprises one or more of the following:
no sidelink resource is currently allocated to the first terminal; or
one or more sidelink resources currently allocated to the first terminal cannot carry a media access control control element (MAC CE) of the first sidelink CSI reporting and a packet header of the MAC CE.

4. The method according to claim 2, further comprising:
receiving a second message, wherein the second message comprises a first SR configuration identifier, and the first SR configuration identifier is associated with the first SR configuration and the first SR resource.

5. The method according to claim 2, further comprising:
canceling the first SR in response to the first timer timing out.

6. The method according to claim 5, wherein the canceling the first SR in response to the first timer timing out comprises:
canceling the first SR in response to a first condition being met when the first timer times out, wherein the first condition comprises one or more of the following:
the first terminal does not receive the first sidelink resource; or
the first terminal does not generate a media access control protocol data unit (MAC PDU) that comprises the first sidelink CSI reporting; or
the first terminal does not send a MAC PDU that comprises the first sidelink CSI reporting.

7. The method according to claim 2, further comprising:
canceling the first SR in response to generating a media access control protocol data unit (MAC PDU) that comprises the first sidelink CSI reporting.

8. The method according to claim 1, further comprising:
stopping the first timer in response to a second condition being met during running of the first timer, wherein the second condition comprises one or more of the following:
the first terminal has a sidelink resource; or
the sidelink resource is able to carry a media access control (MAC) control element (CE) of the first sidelink CSI reporting and a packet header of the MAC CE; or
the first terminal generates a media access control (MAC) protocol data unit (PDU) that comprises the first sidelink CSI reporting; or
the first terminal already sends a MAC PDU that comprises the first sidelink CSI reporting.

9. The method according to claim 1, wherein canceling the first sidelink CSI reporting in response to the first timer timing out comprises:
canceling the first sidelink CSI reporting in response to a first condition being met when the first timer times out, wherein the first condition comprises one or more of the following:
the first terminal does not receive a first sidelink resource; or
the first terminal does not generate a media access control protocol data unit (MAC PDU) that comprises the first sidelink CSI reporting; or
the first terminal does not send a MAC PDU that comprises the first sidelink CSI reporting.

10. The method according to claim 1, further comprising:
obtaining a first sidelink resource configured by a base station for the first terminal; and
sending the first sidelink CSI reporting on the first sidelink resource.

11. The method according to claim 1, wherein the first timer is for the first sidelink CSI reporting.

12. An apparatus, comprising:
a transceiver; and
a processor, configured to:
trigger first sidelink channel state information (CSI) reporting;
in response to the first sidelink CSI reporting being triggered, start a first timer, wherein a length of the first timer is a maximum allowed delay of sending the first sidelink CSI reporting; and
cancel the first sidelink CSI reporting in response to the first timer timing out, wherein the first sidelink CSI reporting is used by the apparatus to feed back, to a second terminal, CSI of a sidelink between the apparatus and the second terminal; and
wherein the transceiver is configured to:
receive access stratum configuration information of the sidelink carried by a radio resource control (RRC) message from the second terminal, wherein the access stratum configuration information indicates the maximum allowed delay of the first sidelink CSI reporting.

13. The apparatus according to claim 12, wherein:
the processor is configured to:
in response to the first sidelink CSI reporting being triggered, trigger a first scheduling request (SR) when a preset condition is met; and
the transceiver is configured to:
send the first SR on a first SR resource based on a first SR configuration, wherein the first SR configuration and the first SR resource correspond to an SR that requests a first sidelink resource for transmitting the first sidelink CSI reporting.

14. The apparatus according to claim 13, wherein the preset condition comprises one or more of the following:
no sidelink resource is currently configured for the apparatus; or
one or more sidelink resources currently allocated to the apparatus cannot carry a media access control (MAC) control element (CE) of the first sidelink CSI reporting and a packet header of the MAC CE.

15. The apparatus according to claim 13, wherein the transceiver is further configured to:
receive a second message, wherein the second message comprises a first SR configuration identifier, and the first SR configuration identifier is associated with the first SR configuration and the first SR resource.

16. The apparatus according to claim 13, wherein the processor is configured to:
cancel the first SR in response to generating a media access control (MAC) protocol data unit (PDU) that comprises the first sidelink CSI reporting.

17. The apparatus according to claim 13, wherein:
the processor is configured to cancel the first SR in response to the first timer timing out.

18. The apparatus according to claim 17, wherein:
the processor is configured to:
  cancel the first SR in response to the first timer timing out and a first condition being met when the first timer times out, wherein the first condition comprises one or more of the following:
  the apparatus does not receive the first sidelink resource; or
  the apparatus does not generate a media access control protocol data unit (MAC PDU) that comprises the first sidelink CSI reporting; or
  the apparatus does not send a MAC PDU that comprises the first sidelink CSI reporting.

19. The apparatus according to claim 12, wherein:
the processor is configured to:
  stop the first timer in response to a second condition being met during running of the first timer, wherein the second condition comprises one or more of the following:
  the apparatus has a sidelink resource; or
  the sidelink resource is able to carry a media access control control element (MAC CE) of the first sidelink CSI reporting and a packet header of the MAC CE; or
  the apparatus generates a media access control protocol data unit (MAC PDU) that comprises the first sidelink CSI reporting; or
  the apparatus already sends a MAC PDU that comprises the first sidelink CSI reporting.

20. The apparatus according to claim 12, wherein:
the processor is configured to:
  cancel the first sidelink CSI reporting in response to a first condition being met when the first timer times out, wherein the first condition comprises one or more of the following:
  the apparatus does not receive a first sidelink resource; or
  the apparatus does not generate a media access control protocol data unit (MAC PDU) that comprises the first sidelink CSI reporting; or
  the apparatus does not send a MAC PDU that comprises the first sidelink CSI reporting.

21. The apparatus according to claim 12, wherein:
the processor is configured to:
  obtain a first sidelink resource configured by a base station for the apparatus; and
  send the first sidelink CSI reporting on the first sidelink resource.

22. A non-transitory computer-readable storage medium, storing a computer program or instructions, and when the instructions are executed on an apparatus, the apparatus is enabled to perform at least:
  receiving access stratum configuration information of a sidelink carried by a radio resource control (RRC) message from a second terminal, wherein the access stratum configuration information indicates a maximum allowed delay of first sidelink channel state information (CSI) reporting;
  triggering the first sidelink CSI reporting;
  in response to the first sidelink CSI reporting being triggered, starting a first timer, wherein a length of the first timer is the maximum allowed delay of the first sidelink CSI reporting; and
  canceling the first sidelink CSI reporting in response to the first timer timing out, wherein the first sidelink CSI reporting is used by the apparatus to feed back, to the second terminal, CSI of a sidelink between the apparatus and the second terminal.

* * * * *

UNITED STATES PATENT AND TRADEMARK OFFICE
CERTIFICATE OF CORRECTION

PATENT NO. : 12,471,087 B2
APPLICATION NO. : 17/755428
DATED : November 11, 2025
INVENTOR(S) : Xu et al.

Page 1 of 1

It is certified that error appears in the above-identified patent and that said Letters Patent is hereby corrected as shown below:

In the Specification

In Column 15, Line 40, delete "Si" and insert -- S1 --.

In Column 32, Line 52, delete "6n," and insert -- 611, --.

In Column 41, Line 5, delete "module 11," and insert -- module 111, --.

In the Claims

In Column 45, in Claim 2, Line 6, delete "triggering," and insert -- triggering --.

In Column 45, in Claim 3, Lines 18-19, delete "control control" and insert -- control (MAC) control --.

In Column 45, in Claim 3, Line 19, delete "(MAC CE)" and insert -- (CE) --.

Signed and Sealed this
Thirtieth Day of December, 2025

John A. Squires
*Director of the United States Patent and Trademark Office*